(12) United States Patent
Ohba et al.

(10) Patent No.: US 11,010,901 B2
(45) Date of Patent: May 18, 2021

(54) INFORMATION PROCESSING APPARATUS AND IMAGE REGION SEGMENTATION METHOD

(71) Applicant: SONY INTERACTIVE ENTERTAINMENT INC., Tokyo (JP)

(72) Inventors: Akio Ohba, Kanagawa (JP); Hidehiko Ogasawara, Tokyo (JP); Hiroyuki Segawa, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 175 days.

(21) Appl. No.: 16/328,746

(22) PCT Filed: Aug. 31, 2017

(86) PCT No.: PCT/JP2017/031334
§ 371 (c)(1),
(2) Date: Feb. 27, 2019

(87) PCT Pub. No.: WO2018/047706
PCT Pub. Date: Mar. 15, 2018

(65) Prior Publication Data
US 2019/0213739 A1    Jul. 11, 2019

(30) Foreign Application Priority Data

Sep. 7, 2016    (JP) .............................. JP2016-174995

(51) Int. Cl.
*G06K 9/00* (2006.01)
*G06T 7/11* (2017.01)
(Continued)

(52) U.S. Cl.
CPC ............ *G06T 7/11* (2017.01); *G06K 9/00208* (2013.01); *G06K 9/4604* (2013.01);
(Continued)

(58) Field of Classification Search
CPC ............ G06K 9/4661; G06K 9/00201; G06K 9/2036; G06K 2009/487; G06K 9/46;
(Continued)

(56) References Cited

U.S. PATENT DOCUMENTS

2010/0289878 A1*  11/2010  Sato ....................... G03B 35/26
                                                              348/46
2014/0300600 A1   10/2014  Marks et al.
(Continued)

FOREIGN PATENT DOCUMENTS

EP          0999518 A1    5/2000
JP       2009-58533 A    3/2009
(Continued)

OTHER PUBLICATIONS

International Search Report and Written Opinion dated Oct. 31, 2017, from International Application No. PCT/JP2017/031334, 9 sheets.

(Continued)

*Primary Examiner* — Li Liu
(74) *Attorney, Agent, or Firm* — Katten Muchin Rosenman LLP

(57) ABSTRACT

A captured image acquisition section 50 acquires, from an imaging apparatus 12, data of a polarized image obtained by capturing a target object and stores the data into an image data storage section 52. A normal line distribution acquisition section 362 of a region segmentation section 310 acquires a distribution of normal line vectors of a subject surface using the polarized image. A region decision section 312 evaluates the distribution of normal line vectors with a predetermined criterion indicating stability such as a dispersion and determines a region in which the stability is high as a region of a figure of a subject to segment the image. An output data generation section 56 carries out various processes using a result of the segmentation to generate output data.

10 Claims, 18 Drawing Sheets

(51) Int. Cl.
*G06K 9/46* (2006.01)
*G06T 7/00* (2017.01)
*G06T 7/73* (2017.01)

(52) U.S. Cl.
CPC ......... *G06K 9/4642* (2013.01); *G06K 9/4661* (2013.01); *G06T 7/00* (2013.01); *G06T 7/74* (2017.01)

(58) Field of Classification Search
CPC ....... G06T 7/00; G06T 17/00; G06T 2200/04; G06T 7/11
See application file for complete search history.

(56) References Cited

U.S. PATENT DOCUMENTS

| | | | | |
|---|---|---|---|---|
| 2016/0202039 | A1* | 7/2016 | Colle | ................. G01B 11/24 356/369 |
| 2016/0203387 | A1* | 7/2016 | Lee | ..................... G06T 7/73 348/44 |
| 2016/0267348 | A1 | 9/2016 | Kondo | |
| 2018/0253858 | A1* | 9/2018 | Ni | ........................ G06T 17/00 |

FOREIGN PATENT DOCUMENTS

| | | |
|---|---|---|
| JP | 2010-061655 A | 3/2010 |
| JP | 2012-80065 A | 4/2012 |
| JP | 2013-054011 | 3/2013 |
| JP | 2014-203458 A | 10/2014 |
| JP | 2015-115041 A | 6/2015 |
| WO | 2009147814 A1 | 12/2009 |

OTHER PUBLICATIONS

Gary Atkinson and Edwin R. Hancock, "Recovery of Surface Orientation from Diffuse Polarization," IEEE Transactions on Image Processing, Jun. 2006, 15(6), pp. 1653 to 1664.

International Preliminary Report on Patentability dated Mar. 12, 2019, from International Application No. PCT/JP2017/031334, 16 sheets.

Notification of Reason for Refusal dated Jan. 21, 2020, from Japanese Application No. 2016-174995, 5 sheets.

* cited by examiner

| IDENTIFICATION INFORMATION | SHAPE | COLOR | MATERIAL |
|---|---|---|---|
| 01 | CONTROLLER | BLACK | PLASTIC |
| 02 | HAND | FLESH COLOR | SKIN |
| 03 | FACE | FLESH COLOR | SKIN |
| 04 | EYEBALL | WHITE/BLACK | EYEBALL |
| ... | ... | ... | ... |

160

INFORMATION PROCESSING APPARATUS AND IMAGE REGION SEGMENTATION METHOD

TECHNICAL FIELD

The present invention relates to an information processing apparatus that utilizes a captured image to recognize a state of a subject and an image region segmentation method.

BACKGROUND ART

A game is known which utilizes a display image formed by capturing an image of part of the body of a user such as the head by a video camera and extracting and replacing a predetermined region of the image such as the eye, the mouth, or the hand with a different image (for example, refer to PTL 1). Also, a user interface system is known which accepts a movement of the mouth or the hand whose image is captured by a video camera as an operation instruction of an application. The technology for capturing an image of a real world and displaying a virtual world that reacts with the movement in the real world or utilizing the image in some information processing is utilized in a wide range of fields irrespective of the scale from a small-sized portable terminal to leisure facilities.

CITATION LIST

Patent Literature

[PTL 1]
Published European Patent Application No. 0999518

SUMMARY

Technical Problem

In image analysis of acquiring the position or the posture of a target object from a captured image, there is a problem that the accuracy in processing is liable to become unstable due to the appearance, position, image capturing environment, and the like of the target object. For example, in a general technology that utilizes feature points to extract a figure of a target object from a captured image or perform matching, the accuracy of processing deteriorates if a target object originally has an insufficient number of feature points or if a target object exists at a position far from a camera and is small in apparent size. As a request for robustness in processing accuracy increases, a granularity of processing is decreased spatially or temporally or the algorithm is complicated, resulting in increase of a processing load.

The present invention has been made in view of such a problem as described above, and it is an object of the present invention to provide a technology capable of acquiring a state of a target object efficiently and accurately using a captured image.

Solution to Problem

A mode of the present invention relates to an information processing apparatus. This information processing apparatus includes a normal line distribution acquisition section configured to acquire a distribution of normal line vectors of a subject surface from a captured polarized image, a region segmentation section configured to specify a region of a figure for each subject and segment an image plane by evaluating stability of the distribution of the normal line vectors with a given criterion, and an output data generation section configured to perform a process based on a result of the segmentation to generate output data and output the output data.

Another mode of the present invention relates to an image region segmentation method. This image region segmentation method includes a step of acquiring data of a polarized image captured by an imaging apparatus, a step of acquiring a distribution of normal line vectors of a subject surface from the polarized image, a step of evaluating stability of the distribution of the normal line vectors with a given criterion to specify a region of a figure for each subject and segmenting an image plane, and a step of performing processing based on a result of the segmentation to generate output data and outputting the output data to an external apparatus.

It is to be noted that also arbitrary combinations of the constituent features described above and converted matters of the representations of the present invention between a method, an apparatus, and the like are effective as modes of the present invention.

Advantageous Effect of Invention

According to the present invention, a state of a target object can be acquired efficiently and accurately using a captured image.

DESCRIPTION OF EMBODIMENTS

Embodiment 1

Figure 1:
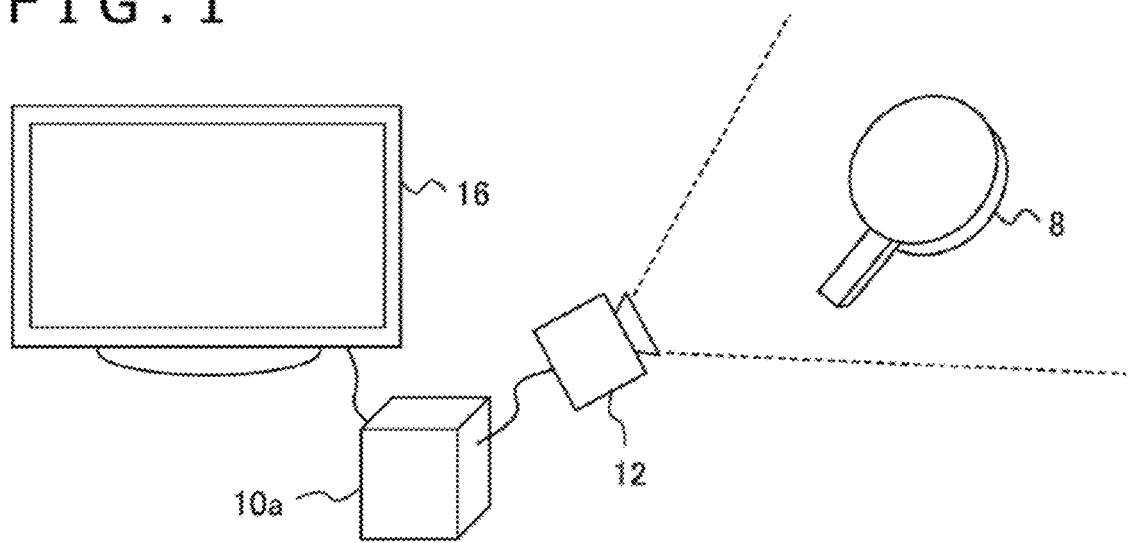
FIG. 1 is a view depicting an example of a configuration of an information processing system according to an embodiment 1.

FIG. 1 depicts an example of a configuration of an information processing system in the present embodiment. This information processing system includes an imaging apparatus 12 capturing an image of a target object 8 at a predetermined frame rate, an information processing apparatus 10a acquiring data of the captured image and performing predetermined information processing, and a display apparatus 16 outputting a result of the information processing. The information processing system may further include an inputting apparatus that accepts an operation for the information processing apparatus 10a from a user. The information processing apparatus 10a may further be communicatable with an external apparatus such as a server by connection to a network such as the Internet.

The information processing apparatus 10a, the imaging apparatus 12, and the display apparatus 16 may be connected with each other by a wire cable or may be wirelessly connected with each other by a wireless LAN (Local Area Network) or the like. Further, two or more of the information processing apparatus 10a, the imaging apparatus 12, and the display apparatus 16 may be combined as an integrated apparatus. For example, the information processing system may be implemented by a camera, a portable terminal, or the like that is equipped with them. As an alternative, the display apparatus 16 may be formed as a head-mounted display that is mounted on the head of a user such that an image is displayed in front of the eyes of the user, and the imaging apparatus 12 may be mounted on the head-mounted display such that an image corresponding to a line of sight of the user may be captured. In any case, the appearance shape of the information processing apparatus 10a, the imaging apparatus 12, and the display apparatus 16 is not limited to a depicted one.

In such a system as described above, the information processing apparatus 10a successively acquires data of images captured at a predetermined frame rate by the imaging apparatus 12 and analyzes the data to specify the position or the posture of the target object 8 in the real space. In a case in which the target object 8 has a variable shape like an elastic body, the information processing apparatus 10a specifies also the shape of the target object 8. Then, the information processing apparatus 10a carries out information processing so as to be compatible with the specified result to generate data of a display image or sound and then outputs the data to the display apparatus 16. The substance of the information processing that is carried out in an associated relationship with the state of the target object 8 is not specifically restricted, and therefore, the target object 8 may be various accordingly.

For example, the target object 8 may be a controller for a game such that an operation for the game may be performed by the user grasping and moving the same. In this case, an image representative of the game world can change in response to the movement of the controller, or an image in which the controller is replaced with a virtual object can be displayed on a captured image capturing the user. Alternatively, also it is possible to cause a head-mounted display to display an image that represents a virtual object interacting with the hand of the user in a field of vision corresponding to a line of sight of the user who has the head-mounted display mounted thereon.

Since the information processing to be performed utilizing the state of the target object 8 in this manner can be considered variously, the following description will be focused on a technique of efficiently and particularly specifying a position, a posture, or a shape of the target object 8 from a captured image. Although a position, a posture, and a shape of a target object are hereinafter referred to collectively as a "state of target object," this does not mean to always specify all of them, but at least one of them may be specified as occasion demands. For this purpose, the imaging apparatus 12 in the present embodiment at least captures a polarized image of an image captured space. Then, the information processing apparatus 10a acquires normal line information of the target object 8 obtained from the polarized image and utilizes the normal line information to particularly specify a state of the target object 8.

Figure 2:
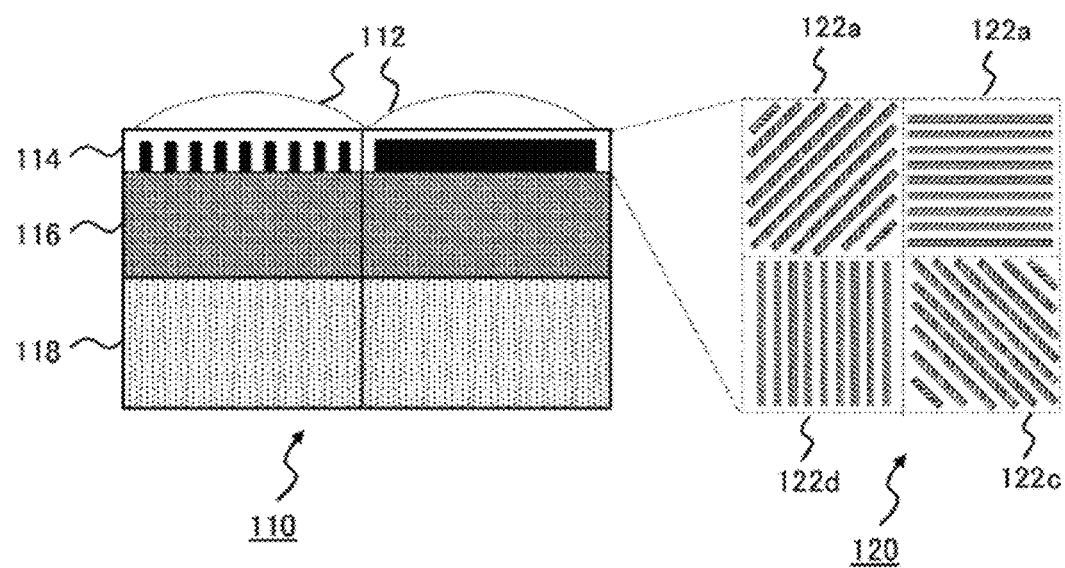
FIG. 2 is a view depicting an example of a structure of an imaging device provided in an imaging apparatus in the embodiment 1.

FIG. 2 depicts an example of a structure of an imaging device provided in the imaging apparatus 12. It is to be noted that FIG. 2 schematically depicts a functional structure of a cross section of the device while a detailed structure of interlayer insulating films, wiring lines, and the like is omitted. The imaging device 110 includes a microlens layer 112, a wire grid type polarizer layer 114, a color filter layer 116, and a light detection layer 118. The wire grid type polarizer layer 114 includes a polarizer formed from a plurality of linear conductor members arrayed in a stripe shape at intervals smaller than a wavelength of incident light. When light condensed by the microlens layer 112 enters the wire grid type polarizer layer 114, a polarized light component in a direction parallel to a line of the polarizer is reflected while only a perpendicularly polarized light component passes through the wire grid type polarizer layer 114.

A polarized image is acquired by detecting the polarized light component passing through the wire grid type polarizer layer 114 by the light detection layer 118. The light detection layer 118 has a semiconductor device structure of a general CCD (Charge Coupled Device) image sensor, a CMOS (Complementary Metal Oxide Semiconductor) image sensor, or the like. The wire grid type polarizer layer 114 includes such an array of polarizers having main axis angles different from each other in a reading unit of charge in the light detection layer 118, namely, in a unit of a pixel or a unit greater than the unit of a pixel. On the right side in FIG. 2, a polarizer array 120 when the wire grid type polarizer layer 114 is viewed from above is exemplified.

A line indicated by slanting lines in FIG. 2 represents a conductor (wire) configuring a polarizer. It is to be noted that a rectangle of a broken line represents a region of a polarizer of one main axis angle, and the broken line itself is not formed actually. In the example depicted, four polarizers of different main axis angles are disposed in four regions 122a, 122b, 122c, and 122d in two rows and two columns. In FIG. 2, polarizers on a diagonal line have the main axis angles orthogonal to each other, and polarizers neighboring with each other have a difference of 45 degrees. In other words, four polarizers of the main axis angles at intervals of 45 degrees are provided.

Each polarizer passes through a polarized light component having a direction orthogonal to the direction of the wire. Consequently, in the underlying light detection layer 118, polarization information of four directions at intervals of 45 degrees can be obtained in regions corresponding to the four regions 122a, 122b, 122c, and 122d. A plurality of such polarizer arrays of the four main axis angles are further arrayed in a longitudinal direction and a lateral direction, and a peripheral circuit controlling a charge reading out timing is connected to them, whereby an image sensor that acquires four different kinds of polarization information at the same time as two-dimensional data can be implemented.

In the imaging device 110 depicted in FIG. 2, the color filter layer 116 is provided between the wire grid type polarizer layer 114 and the light detection layer 118. The color filter layer 116 includes arrays of filters through which light of red, green, or blue passes, for example, in a corresponding relationship to each of pixels. Consequently, polarization information is obtained for individual colors in accordance with a combination of a main axis angle of a polarizer in the wire grid type polarizer layer 114 and a color of a filter in the color filter layer 116 located below the wire grid type polarizer layer 114. In particular, since polarization information of the same direction and the same color is obtained discretely on the image plane, by suitably interpolating the polarization information, a polarized image for each direction and for each color is obtained.

Further, by arithmetically operating polarized images of the same colors, it is also possible to reproduce a non-polarized color image. An image acquisition technology that uses a wire grid type polarizer is disclosed, for example, also in JP 2012-80065 A, or the like. However, the device structure of the imaging apparatus 12 in the present embodiment is not limited to the depicted one. For example, since a polarized luminance image is basically used for specification of a state of a target object in the present embodiment, it is also possible to omit the color filter layer 116 as long as a color image is not required by a different use. Further, the polarizer is not limited to that of the wire grid type, but any polarizer placed into practical use, such as a line dichroic polarizer, may be applicable. Alternatively, a structure in which a polarizing plate whose main axis angle is changeable is disposed on the front of a general camera may be applied.

Figure 3:
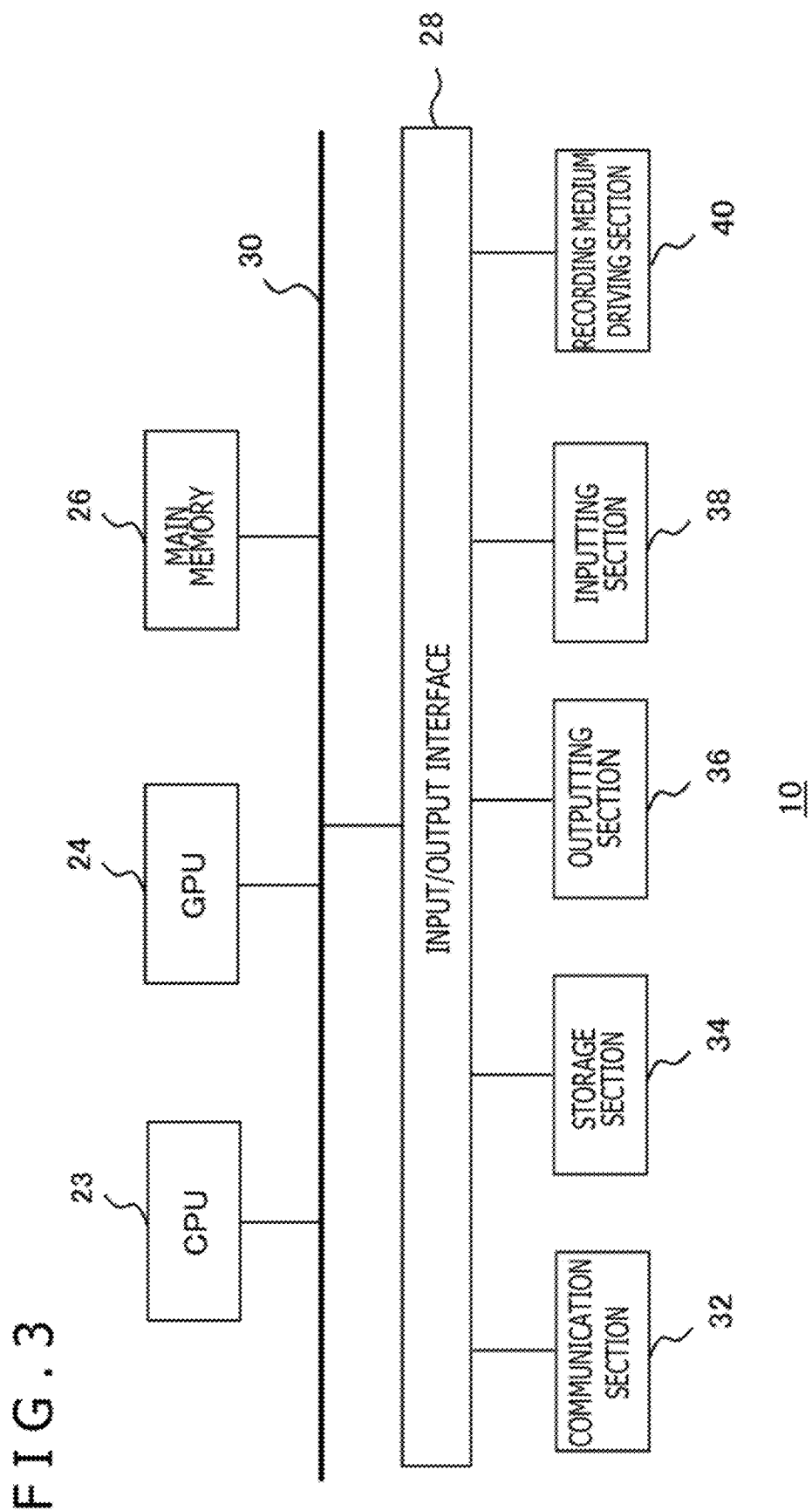
FIG. 3 is a view depicting a configuration of an internal circuit of the information processing apparatus in the embodiment 1.

FIG. 3 depicts an internal circuit configuration of the information processing apparatus 10a. The information processing apparatus 10a includes a CPU (Central Processing Unit) 23, a GPU (Graphics Processing Unit) 24, and a main memory 26. The components mentioned are connected with one another by a bus 30. To the bus 30, an input/output interface 28 is connected further. To the input/output interface 28, a communication section 32 including a peripheral equipment interface such as USB, IEEE1394, or the like or a network interface to a wired or wireless LAN, a storage section 34 such as a hard disk drive, a nonvolatile memory, and the like, an outputting section 36 outputting data to the display apparatus 16, an inputting section 38 receiving data from the imaging apparatus 12 or an inputting apparatus not depicted as an input thereto, and a recording medium driving section 40 driving a removable recording medium such as a magnetic disk, an optical disc, a semiconductor memory, or the like are connected.

The CPU 23 executes an operating system stored in the storage section 34 to control the entire information processing apparatus 10a. Further, the CPU 23 executes various programs read out from a removable recording medium and loaded into the main memory 26 or downloaded through the communication section 32. The GPU 24 has a function of a geometry engine and a function of a rendering processor, performs a drawing process in accordance with a drawing instruction from the CPU 23, and stores data of a display image into a frame buffer not depicted. Then, the GPU 24 converts the display image stored in the frame buffer into a video signal and outputs the video signal to the outputting section 36. The main memory 26 is configured from a RAM (Random Access Memory) and stores programs and data necessary for processing.

Figure 4:
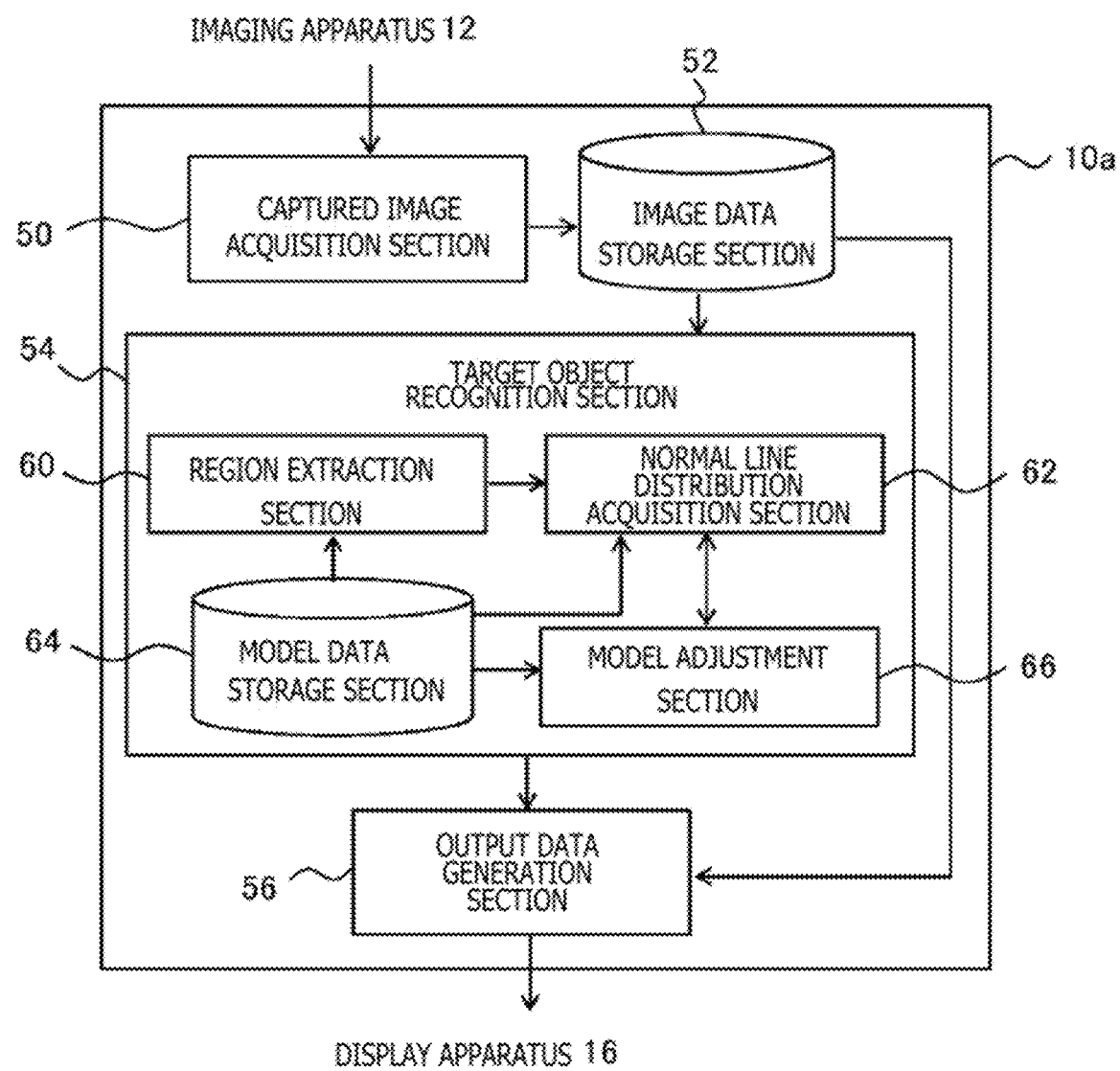
FIG. 4 is a view depicting a configuration of functional blocks of the information processing apparatus in the embodiment 1.

FIG. 4 depicts a configuration of functional blocks of the information processing apparatus 10a of the present embodiment. The functional blocks depicted in FIG. 4 and FIGS. 14 and 15 hereinafter described can be implemented in hardware from such components as the CPU, the GPU, various memories, a data bus, and the like depicted in FIG. 3 and is implemented in software by a program loaded from a recording medium or the like into a memory and demonstrating various functions such as a data inputting function, a data retention function, an arithmetic operation function, an image processing function, a communication function, and the like. Accordingly, it is recognized by those skilled in the art that the functional blocks can be implemented in various forms from hardware only, software only or a combination of them and are not limited to any one of them.

The information processing apparatus 10a includes a captured image acquisition section 50 that acquires data of a captured image from the imaging apparatus 12, an image data storage section 52 that stores the acquired data of the image, a target object recognition section 54 that specifies a state of a target object utilizing the captured image, and an output data generation section 56 that generates data to be output on the basis of the state of the target object. The captured image acquisition section 50 is implemented by the inputting section 38, the CPU 23, and the like of FIG. 3 and acquires data of a polarized image at a predetermined rate from the imaging apparatus 12.

Although the captured image acquisition section 50 acquires at least a polarized image in order to acquire a state of the target object as described above, the captured image acquisition section 50 may further acquire non-polarized (natural light) image data from the substance of information processing to be carried out by the information processing apparatus 10a or an image to be displayed. The image data storage section 52 is implemented by the main memory 26 and successively stores data of a captured image acquired by the captured image acquisition section 50. At this time, the captured image acquisition section 50 generates and stores image data necessary for processing at a succeeding stage, for example, to generate a luminance image from a color image as occasion demands.

The target object recognition section 54 is implemented by the CPU 23, the GPU 24, and the like and specifies a state of a target object using image data stored in the image data storage section 52. In the present embodiment, a predetermined target object is focused to perform analysis, thereby enhancing efficiency of processes and increasing reliability of information obtained from a polarized image. In particular, a three-dimensional model of a target object is registered in advance, and a state of the three-dimensional model is adjusted so as to correspond to a distribution of normal line vectors of the target object successively obtained from the polarized image.

In particular, the target object recognition section 54 includes a region extraction section 60, a normal line distribution acquisition section 62, a model data storage section 64, and a model adjustment section 66. The region extraction section 60 extracts a region in which a figure of a target object appearing in a captured image is included. In a case where a shape or a feature amount of the target object is known from the registered three-dimensional model, it is possible to extract the region by general template matching. In a case where a color image is acquired as a captured image, information of a color can be also utilized.

Alternatively, an article included in a predetermined range within a three-dimensional image captured object space may be specified from a depth image, and the region including a figure of the article may be extracted. The depth image is an image that represents a distance from an imaging plane of a subject as a pixel value in a captured image. The depth image can be obtained, for example, by providing a stereo camera for capturing images of an image captured space from the left and right points of view spaced by a known distance from each other on the imaging apparatus 12 and calculating the distance of the article represented by each figure on the basis of the principle of triangulation from the parallax between corresponding points in the captured stereo image.

As an alternative, a mechanism in which reference light such as infrared light is irradiated upon an image captured space and reflected light of the reference light is detected is mounted on the imaging apparatus 12 to find a distance by a TOF (Time of Flight) method. In any cases, a general technology can be applied to generation of a depth image, and the configuration of the imaging apparatus 12 may be determined suitably depending upon the technology. For example, in a case where a stereo camera is adopted, a general stereo camera capturing an image in natural light may be provided separately from a polarization camera having such an imaging device structure depicted in FIG. 2, or one or both of stereo cameras may be polarization cameras. In a case where a depth image is used, even if a target object has a shape that varies in various manners depending upon its orientation, a region of a figure of the target object can be extracted comparatively accurately.

Further, an extraction technique suitable for a target object, which has been placed in practical use, for specifying a region of a figure of the head of a person by a general face detection process may be adopted suitably. Furthermore, an original figure of a target object may be extracted from a positional relationship to a reference figure after the reference figure is extracted such as to extract a region of the hand from a relatively movable range to the head. In any cases, in the present embodiment, since more detailed information is obtained by a fitting process between a distribution of normal line vectors acquired using a polarized image and a three-dimensional model, the region extraction here may be performed with a comparatively rough resolution. Basic data of the target object necessary for region extraction is stored in the model data storage section 64.

The normal line distribution acquisition section 62 acquires a normal line vector distribution on the target object surface on the basis of polarization information of a region extracted by the region extraction section 60. A technique of utilizing such a characteristic that a behavior of the polarized light intensity with respect to the orientation depends upon the reflection angle of light from the subject to determine a normal line to the subject surface on the basis of a variation of the luminance of the polarized image with respect to an angle variation of the polarizer is generally known. However, a ratio between a specular reflection component and a diffuse reflection component included in reflected light differs depending upon a color or a material of the subject surface, and the relationship between the polarization characteristic and a normal line to the subject varies depending upon the ratio.

Therefore, although a technique of separating observed polarized light into a specular reflection component and a diffuse reflection component and evaluating them has been investigated variously, such techniques have many problems in terms of the accuracy and the load of processing. In the present embodiment, a target object is restricted to find a distribution of normal line vectors on the basis of the unique knowledge that, if a target object is restricted in color or material, there is no large variation in polarization characteristic of reflection light from the surface of the target object and a normal line can be obtained stably. For example, one of a specular reflection model and a diffuse reflection model is selectively used on the basis of a color or a material of the target object.

Further, it is made possible to accurately acquire a distribution of normal line vectors even if reflection components are not accurately separated from each other by utilizing region information extracted by the region extraction section 60 or recursively utilizing a result of state adjustment of a three-dimensional model by the model adjustment section 66. Basic data of a color, a material, and the like of the target object are stored in advance in the model data storage section 64.

The model adjustment section 66 disposes a three-dimensional model representative of a target object in a virtual three-dimensional space in which a camera coordinate system corresponding to an image plane is set and determines the state of the three-dimensional model so as to coincide with a captured image. In particular, the model adjustment section 66 adjusts the position or the posture of the three-dimensional model by moving or rotating the three-dimensional model such that it conforms to a normal line vector distribution of the target object acquired by the normal line distribution acquisition section 62. If the target object is an article that can be deformed due to application of a force by the user, for example, the model adjustment section 66 adjusts the shape of the three-dimensional model as well.

Since a distribution of normal line vectors is obtained in regard to a surface of the target object formed in a captured image, by performing the adjustment taking not only individual normal line vectors but also a shape of a region represented by a set of the normal line vectors into consideration, a relationship between the imaging apparatus and the target object can be reproduced more accurately in the virtual space. Data of the three-dimensional model of the target object are stored into the model data storage section 64. For geometrical calculation relating to the object in the virtual space and the camera, a general technology of computer graphics can be applied.

The output data generation section 56 is implemented by the CPU 23, the GPU 24, the outputting section 36, and the like and carries out predetermined information processing on the basis of a state of the target object specified by the target object recognition section 54 to generate data to be output such as a display image, sound, and the like. As described hereinabove, the substance of information processing to be carried out here is not specifically restricted. For example, in a case where a virtual object is to be drawn such that it contacts with a target object on a captured image, the output data generation section 56 reads out data of the captured image from the image data storage section 52 and draws the object such that it matches with the state of the target object specified by the target object recognition section 54. The output data generation section 56 transmits output data of the display image or the like generated in this manner to the display apparatus 16.

Figures 5, 6:
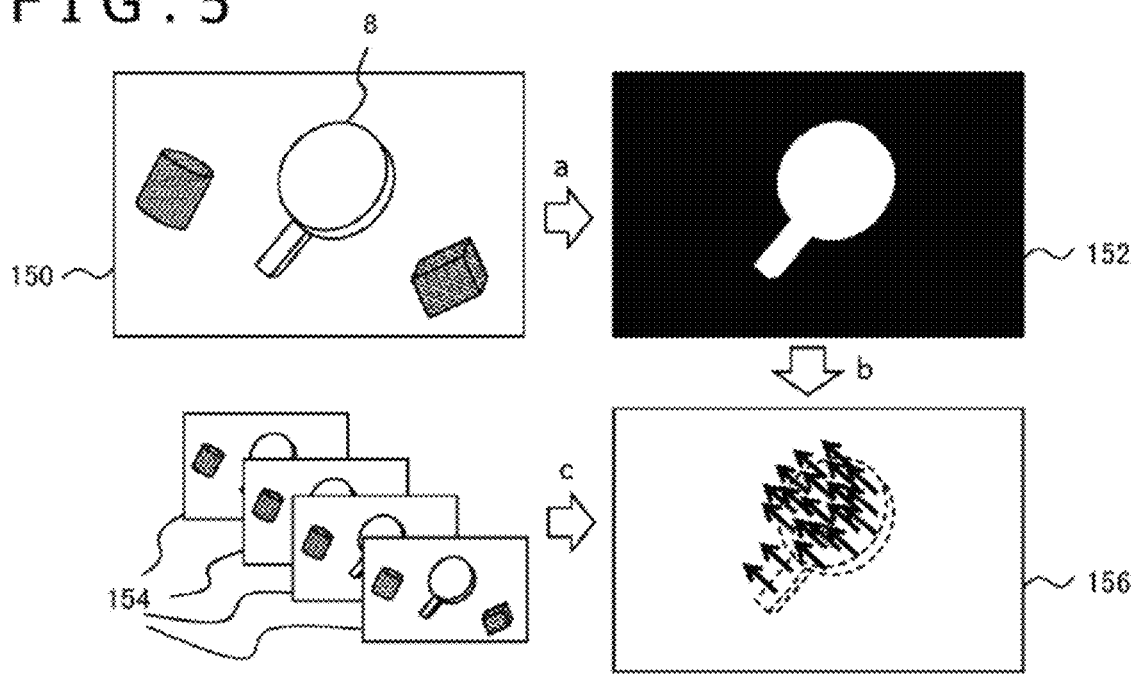
FIG. 5 is a view illustrating a flow until a target object recognition section acquires a distribution of normal line vectors of a target object in the embodiment 1.
FIG. 6 is a view depicting an example of a configuration of basic data of a target object stored in a model data storage section in the embodiment 1.

FIG. 5 is a view illustrating a flow until the target object recognition section 54 acquires a distribution of normal line vectors of a target object in the present embodiment. First, a captured image 150 acquired from the imaging apparatus 12 includes a subject including a target object 8. The region extraction section 60 extracts a region of a figure of the target object 8 from within the captured image 150 (arrow mark a). In FIG. 3, an extraction result is represented by an image 152 in which the extracted region is indicated by void. For the region extraction of the target object, various detection processes based on an appearance of the target object may be carried out as described above or may be based on position information of the target object represented by a depth image. Further, information relating to the state of the target object obtained in preceding image frames may be utilized. Otherwise, they may be combined suitably.

Then, the normal line distribution acquisition section 62 analyzes a polarized image target objecting the extracted region to acquire normal line vectors of the target object (arrow marks b and c). As described hereinabove, a polarized image 154 is obtained for each of a plurality of (for example, four) main axis angles of the polarizer. The normal line distribution acquisition section 62 utilizes them to calculate a luminance variation with respect to the polarization orientation for each pixel and acquires a normal line vector of the target object surface represented by the pixel by a predetermined calculation formula. It is to be noted that the captured image 150 to be used when the region extraction section 60 is to find a region of a figure of the target object 8 may be the polarized image 154 or may be a general image captured separately.

A technology for acquiring various pieces of information of a subject by utilizing a polarized image has been investigated. Also, a method of finding a normal line vector of a surface of a subject is disclosed, for example, in Gary Atkinson and Edwin R. Hancock, "Recovery of Surface Orientation from Diffuse Polarization," IEEE Transactions on Image Processing, June 2006, 15(6), pp. 1653 to 1664, JP 2009-58533 A, or the like, and in the present embodiment, this may be applied. In the following, an overview will be described.

First, the luminance of light observed through a polarizer changes as given by the following expression with respect to the main axis angle $\theta_{pol}$ of the polarizer.

[Math. 1]

$$I = \frac{I_{max} + I_{min}}{2} + \frac{I_{max} - I_{min}}{2}\cos(2(\theta_{pol} - \varphi))$$ (Expression 1)

Here, $I_{max}$ and $I_{min}$ are a maximum value and a minimum value of the luminance observed, respectively, and $\varphi$ is a polarization phase. In a case where a polarized image is acquired in regard to four main axis angles $\theta_{pol}$ as described hereinabove, the luminance I of a pixel at the same position satisfies the expression 1 for each main axis angle $\theta_{pol}$. Accordingly, by approximating a curve that passes through the coordinates $(I, \theta_{pol})$ to a cosine function using a least squares method, $I_{max}$, $I_{min}$, and $\varphi$ can be found. Using $I_{max}$ and $I_{min}$ found in this manner, the polarization degree $\rho$ is calculated by the following expression.

[Math. 2]

$$\rho = \frac{I_{max} - I_{min}}{I_{max} + I_{min}}$$ (Expression 2)

A normal line to a target object surface can be represented by an orientation angle $\alpha$ representative of an angle of an incident surface (in the case of diffuse reflection, an exit surface) of light and a zenith angle $\theta$ representative of an angle on the surface. Further, according to a dichroic reflection model, a spectrum of reflection light is represented by a linear sum of spectra of specular reflection and diffuse reflection. Here, the specular reflection is light regularly reflected by the surface of an article, and the diffuse reflection is light diffused by dye particles configuring an article. The orientation angle $\alpha$ described hereinabove is a main axis angle that provides, in the case of specular reflection, the minimum luminance $I_{min}$ in the expression 1, and provides, in the case of diffuse reflection, the maximum luminance $I_{max}$ in the expression 1.

The zenith angle $\theta$ has the following relationship with the polarization degree $\rho_s$ in the case of specular reflection and with the polarization degree $\rho_d$ in the case of diffuse reflection.

[Math. 3]

$$\rho_s = \frac{2\sin^2\theta\cos\theta\sqrt{n^2 - \sin^2\theta}}{n^2 - \sin^2\theta - n^2\sin^2\theta + 2\sin^4\theta}$$

$$\rho_d = \frac{(n - 1/n)^2\sin^2\theta}{2 + 2n^2 - (n + 1/n)^2\sin^2\theta + 4\cos\theta\sqrt{n^2 - \sin^2\theta}}$$

(Expression 3)

Here, n is the refractive index of the target object. By substituting the polarization degree $\rho$ obtained from the expression 2 into one of $\rho_s$ and $\rho_d$ in the expression 3, a zenith angle $\theta$ is obtained. From the orientation angle $\alpha$ and the zenith angle $\theta$ obtained in this manner, a normal line vector $(p_x, p_y, p_z)$ is obtained in the following manner.

[Math. 4]

$$\begin{pmatrix} p_x \\ p_y \\ p_z \end{pmatrix} = \begin{pmatrix} \cos\alpha\cos\theta \\ \sin\alpha\cos\theta \\ \sin\theta \end{pmatrix}$$ (Expression 4)

From a relationship between the luminance I represented by each pixel of a polarized image and a main axis angle $\theta_{pol}$ of a polarizer, a normal line vector of the target object on the pixel is calculated in this manner, and a normal line vector distribution of the overall figure can be obtained. However, as described above, observed light includes a specular reflection component and a diffuse reflection component, and the calculation technique of the normal line vector differs depending upon this. In the present embodiment, by restricting a process to an article whose material or color is known, an appropriate model between specular reflection and diffuse reflection is selected in advance. Even if the observed light includes the other component, since the ratio between the components is considered stable in regard to a surface of the same target object, an influence of the error can be reduced by using approximation with a three-dimensional model as a process at a succeeding stage.

FIG. 6 depicts an example of a structure of basic data of a target object stored in the model data storage section 64. The target object data 160 includes an identification information column 162a, a shape column 162b, a color column 162c, and a material column 162d. In the identification information column 162a, a number for identification of a target object is set. For example, in a game in which a controller is used, when it is necessary to acquire a state of the controller, by designating an identification number in the program, the target object recognition section 54 recognizes the controller as a target object.

In the shape column 162b, a model shape of the target object is designated. Although, in the example depicted, names of articles such as "controller," "hand," "face," and "eyeball" are described, polygon models or the like representative of a three-dimensional shape of the individual articles are actually generated and linked. In the color column 162c and the material column 162d, a color and a material of the target object are designated, respectively. Also the format in those columns is not limited to the depicted one and may be more detailed data. In a case where the color or the material differs depending upon a portion, position information may be designated in an associated relationship with the color or the material.

The region extraction section 60 can extract a region of a figure of a target object from a captured image on the basis of an apparent shape or color of the target object indicated in the shape column 162b or the color column 162c. Further, a template image or feature amount data that are collated directly with information designated by the target object data 160 but can be utilized for an attribute of an article indicated by the shape column 162b is linked, so that a region is extracted by a matching process.

The normal line distribution acquisition section 62 determines, on the basis of the color and the material indicated by the color column 162c and the material column 162d, respectively, whether a specular reflection model is to be used or a diffuse reflection model is to be used. This makes it possible to efficiently obtain a normal line vector proximate to a real one without separating or estimating a luminance component. Further, since the model adjustment section 66 adjusts the state of a three-dimensional model of the target object so as to obtain a more proximate state to the real one as the overall normal line vector distribution, the influence of an error included steadily by a component difference or a local error on a result can be suppressed.

At this time, the model adjustment section 66 performs adjustment using a three-dimensional model of a target object indicated by the shape column 162b. It is to be noted that the data for determining a model to be used for calculation of a normal line vector is not limited to the depicted ones. In other words, one of the color and the material may be used, or some other attribute may be utilized, or they may be combined suitably.

Figure 7:
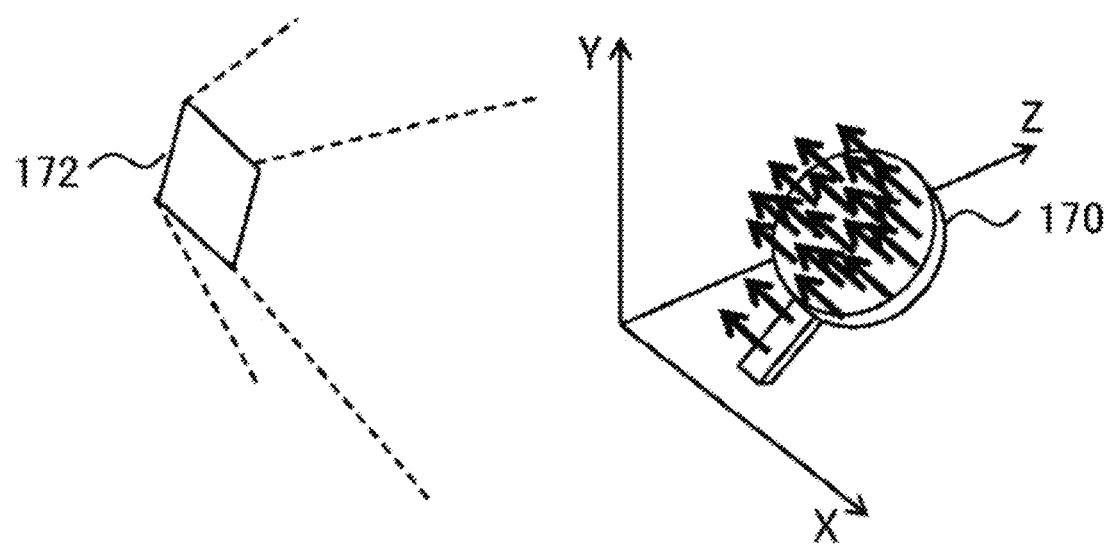
FIG. 7 is a view illustrating a process of a model adjustment section adjusting a state of a three-dimensional model of a target object in the embodiment 1.

FIG. 7 is a view illustrating a process of the model adjustment section 66 adjusting the state of a three-dimensional model of a target object on the basis of normal line vectors determined in such a manner as depicted in FIG. 5. The model adjustment section 66 places a three-dimensional model 170 of a target object on a world coordinate system to which a camera coordinate system 172 is set and moves, rotates, or deforms the three-dimensional model 170 to find a state that more fits the distribution of normal line vectors acquired by the normal line distribution acquisition section 62.

Since the normal line distribution acquisition section 62 can acquire a normal line vector using a pixel of a captured image as a minimum unit, it can find a state of the target object with a high degree of accuracy by comparing the normal line vector with a normal line vector at a corresponding position of the three-dimensional model 170 to evaluate compatibility. For example, when the normal line vector at the ith position of the three-dimensional model 170 is represented by $M_i$, the normal line vector at the corresponding position acquired by the normal line distribution acquisition section 62 by $p_i$ and the total number of normal line vectors to be compared by N, the state of the three-dimensional model 170 is adjusted such that an evaluation value E given below becomes minimum.

[Math. 5]

$$E=\Sigma_{i=0}^{N-1}|M_i-p_i| \qquad \text{(Expression 5)}$$

At this time, it may be simultaneously adopted as an evaluation criterion that the size and the shape of a figure of the three-dimensional model 170 projected to the camera coordinate system 172 corresponding to the image plane are proximate to those of the region extracted by the region extraction section 60. In the expression 5, as the total number N of normal line vectors to be compared increases, the influence of a local error or noise can be suppressed, and it is easier to obtain the state of the entire target object accurately. On the other hand, in a case where it is known that different portions of a target object differ in reliability of a normal line vector determined from a polarized image, weighting may be performed such that the influence on the evaluation value E is controlled depending upon the reliability, or fitting may be performed only at a portion having high reliability.

Figure 8:
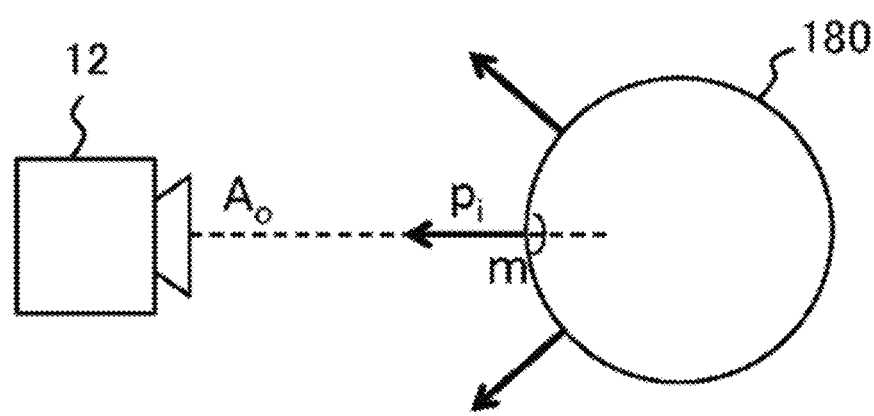
FIG. 8 is a view depicting an example in which a difference occurs in reliability of normal line vectors obtained from a polarized image in the embodiment 1.

FIG. 8 depicts an example in which a difference occurs in reliability of a normal line vector obtained from a polarized image. As depicted, in such a state that an image of a target object 180 is captured from a direction perpendicular to the surface of the target object 180, the orientation dependency of the polarized luminance decreases as a distance to the position m on the optical axis $A_o$ of the imaging apparatus 12 decreases, and the normal line vector $p_i$ to be calculated becomes more liable to be influenced by noise. As a result, the reliability becomes lower as the distance of a normal line vector to the position m decreases. In such a case as just described, a fitting accuracy of a three-dimensional model is increased by providing, to a normal line vector, a weight that increases as the distance of the normal line vector from the position m increases to calculate the evaluation value E.

[Math. 6]

$$E=\Sigma_{i=0}^{N-1}k_i|M_i-p_i| \qquad \text{(Expression 6)}$$

Here, $k_i$ is a weight coefficient to be provided to a comparison result of the ith normal line vector and can be determined on the basis of the shape of the target object and the relative position of the imaging apparatus 12. $k_i$ may be distributed such that it assumes a minimum value at the position m that is a singular point and monotonically increases as the distance from the position m increases, or different values may be set to a predetermined range that includes the position m and other regions.

As an alternative, the coefficient $k_i$ may be set to a predetermined range including the position m such that normal line vectors included in the range are excluded from an object of the fitting process. Here, the "predetermined range" may be determined on the basis of an area or may be a range within which the angle defined by the optical axis $A_o$ of the imaging apparatus 12 and the calculated normal line vector or a normal line vector of the three-dimensional model obtained in a preceding image frame is equal to or smaller than a threshold value or the like.

It is to be noted that the mode for introducing the coefficient $k_i$ is not limited to the positional relationship between the shape of the target object depicted in FIG. 8 and the imaging apparatus 12. For example, if a portion at which a difference occurs in acquisition accuracy of a normal line vector from a polarized image is included even in one target object due to an appearance characteristic the target object originally has, for example, a color, a material, a shape, or the like, a distribution of the coefficient $k_i$ according to this is applied. In this case, since the coefficient $k_i$ can be determined in an associated relationship with the position on the surface of the target object, the distribution is created and stored into the model data storage section 64 in advance. Upon operation, a final coefficient distribution may be determined further taking the positional relationship of the imaging apparatus 12 into account.

Furthermore, the distribution of the coefficient $k_i$ may be determined from a point of view other than the acquisition accuracy of a normal line vector. For example, in a case where the target object has a portion whose position or posture in a three-dimensional space can be obtained with high accuracy on the basis of the size or the shape of a figure in a captured image such as a case in which the target object has a marker of a predetermined shape or a predetermined color, the distribution of the coefficient $k_i$ may be determined such that the weight of a normal line vector at the portion is higher than those in the other portions. A distribution of the coefficient $k_i$ may be determined in accordance with an evaluation criterion including a combination of such a point of view as described above and acquisition accuracy of a normal line vector.

If a state of the target object 8 is found once as a result of fitting with the three-dimensional model, then the region extraction section 60 can more accurately narrow down the region to be extracted by later processing. Further, if the result is fed back also to the normal line distribution acquisition section 62, then also it is possible to correct, in later calculation of a normal line vector, an error caused by a difference in actual luminance component from the applied model, or the like. Even if the accuracy in region extraction is not sufficiently high because the target object is positioned at a place spaced away from the imaging apparatus 12 or is small in size, the position, the posture, deformation amount, and the like can be obtained with high accuracy in a unit of a pixel by fitting between a distribution of normal line vectors and the three-dimensional model.

Figure 9:
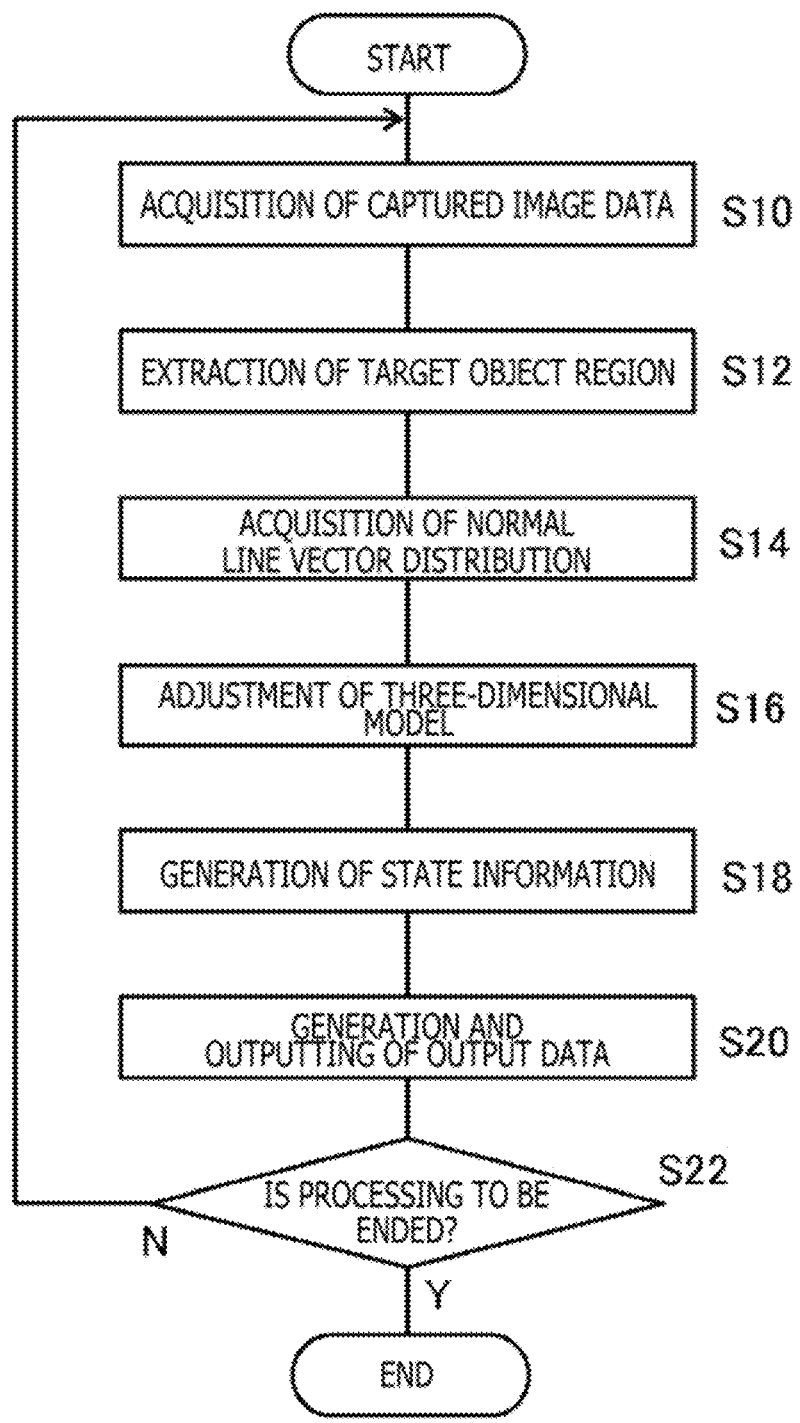
FIG. 9 is a flow chart depicting a processing procedure of acquiring a state of a target object using a polarized image and generating and outputting output data by the information processing apparatus of the embodiment 1.

Now, operation of the information processing apparatus implemented by the configuration described above will be described. FIG. 9 is a flow chart depicting a processing procedure by the information processing apparatus 10a of the present embodiment for acquiring a state of a target object using a polarized image and generating and outputting output data. This flow chart is started when the imaging apparatus 12 starts capturing of a target object in response to a request to start processing issued to the information processing apparatus 10a by a user.

First, the captured image acquisition section 50 acquires data of a captured image from the imaging apparatus 12 (S10). The data may include an image of natural light in addition to polarized images corresponding to a plurality of main axis angles. The image in natural light may be a stereo image from the left and right points of view captured by a stereo camera. Alternatively, at least one of the stereo images may be a polarized image. The imaging apparatus 12 or the information processing apparatus 10a may produce an image of natural light by arithmetically operating polarized images.

Then, the region extraction section 60 of the target object recognition section 54 extracts a region of the captured image in which a figure of the target object appears (S12). This process may be performed by a matching process from the image in natural light or the polarized image on the basis of the color, the shape, the feature points, or the like of the target object or may be performed on the basis of position information of a depth image generated from the stereo image. Otherwise, they may be combined suitably. Further, in regard to a succeeding image frame, the state information specified in the preceding image frames may be utilized.

Then, the normal line distribution acquisition section 62 acquires a distribution of normal line vectors in the extracted region of the figure of the target object using the polarized image (S14). At this time, preferably the vector calculation technology is optimized by selecting one of a specular reflection model and a diffuse reflection model in response to the color, the material, or the like of the target object. Then, the model adjustment section 66 adjusts the state of a three-dimensional model of the target object in a virtual space such that it corresponds to the distribution of the normal line vectors obtained from the polarized image (S16). At this time, the size or the shape of the region of the figure of the target object in the captured image may be also taken into consideration simultaneously.

The model adjustment section 66 finally determines the state of the target object in the three-dimensional space in this manner and generates state information representing this in a predetermined format (S18). The output data generation section 56 acquires the information and generates output data of a display image or sound by causing the game to progress or causing a virtual object to be drawn on the captured image on the basis of the acquired information and then outputs the output data to the display apparatus 16 (S20).

Within a period within which there is no necessity to stop processing by a user operation or the like (N at Step S22), the processes at Steps S10 to S20 are repeated for succeeding image frames. Consequently, a game screen image according to a movement of the target object or a result of the information processing is displayed as a moving image. If it becomes necessary to stop the processing by a user operation or the like, then all processing is ended (Y at Step S22).

FIGS. 10 to 13 exemplify distributions of normal line vectors obtained by the present embodiment. In FIGS. 10 to 13, arrow marks indicative of a normal line vector are represented as a distribution on a certain pixel column of a captured image. However, this does not mean to restrict the range for acquisition of a normal line vector upon operation to this. In other words, normal line vectors may be obtained as a one-dimensional distribution or a two-dimensional distribution in this manner in accordance with a purpose of use. Also the density of the distribution may be optimized depending upon the attribute, the size, the purpose of use, and the like of the target object.

Figure 10:
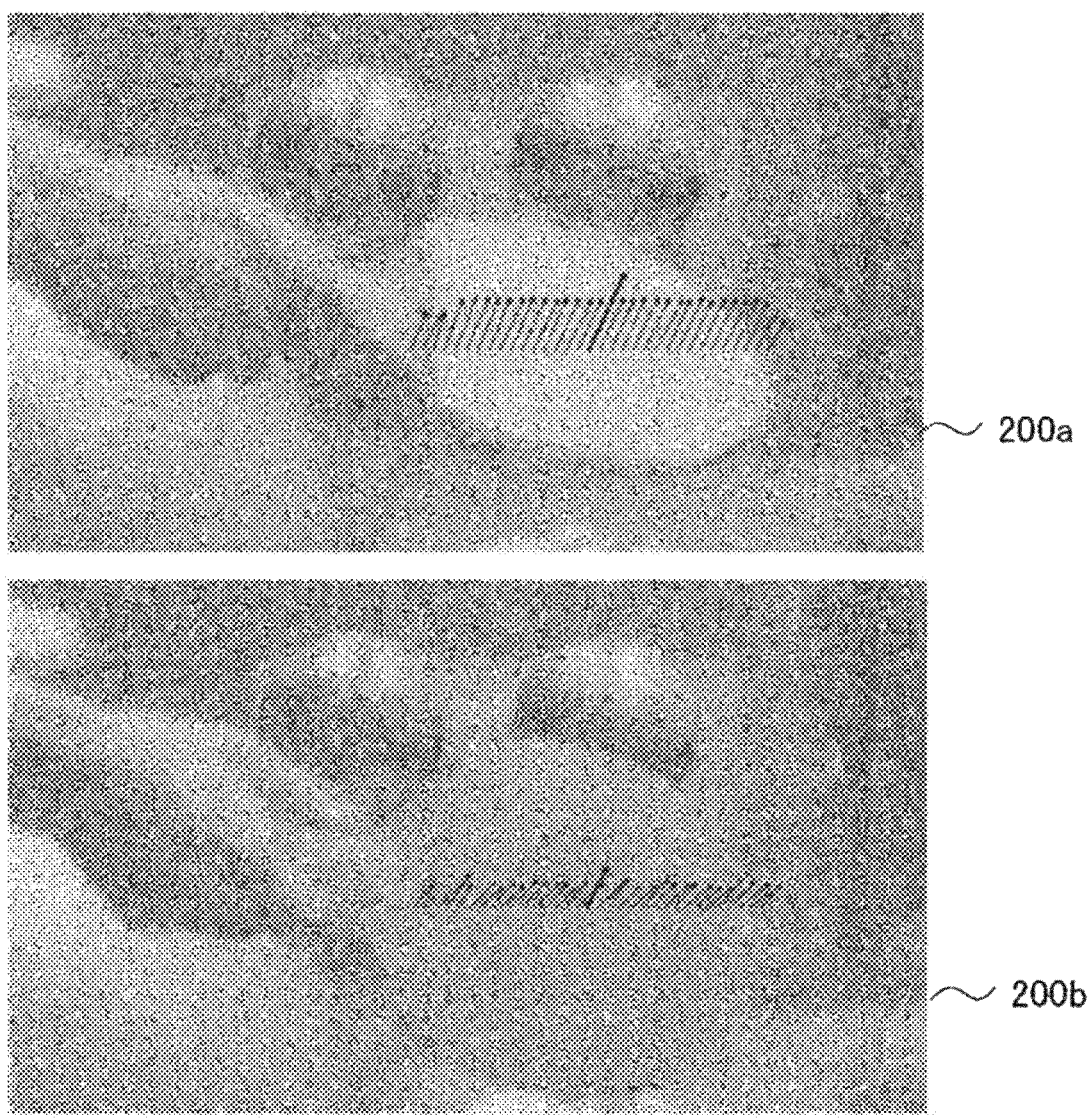
FIG. 10 is a view exemplifying distributions of normal line vectors obtained in the embodiment 1.

First, FIG. 10 depicts a table tennis racket as a target object and represents distributions of normal line vectors on surfaces of the rackets. It can be seen that, on both of an image 200a at an upper stage and an image 200b at a lower stage, normal line vectors are obtained uniformly on the surfaces, and noise or local errors are suppressed. Further, the normal line vectors also vary accurately in response to a variation of the orientation of each of the surfaces of the rackets in both images. By acquiring the orientation of the surfaces accurately in this manner, it is possible to cause each of the surfaces and a virtual object to interact with each other, and possible to utilize an actual racket as a controller for a table tennis game.

Figure 11:
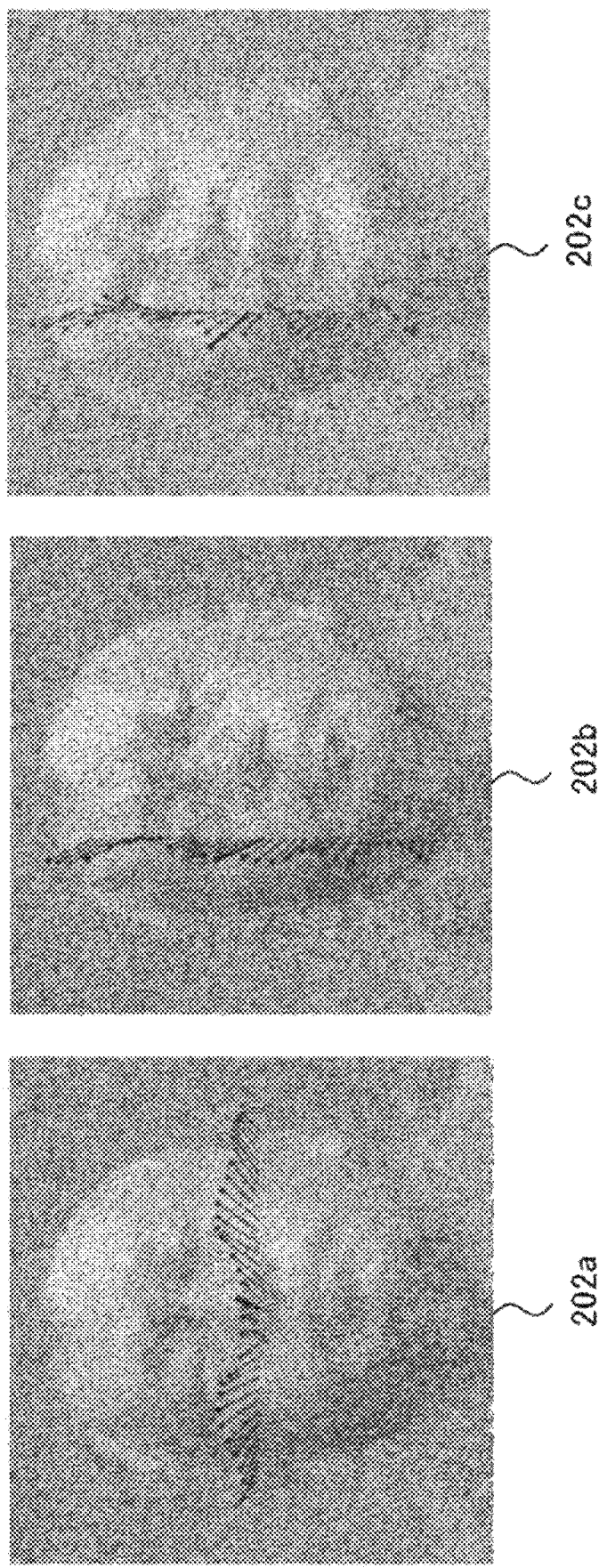
FIG. 11 is a view exemplifying distributions of normal line vectors obtained in the embodiment 1.

FIG. 11 depicts a face of a person as a target object. As indicated by images 202a and 202b, normal lines can be acquired accurately even from a target object including complicated curved surfaces like those of the face in both of the horizontal direction and the vertical direction. Further, as seen from the images 202b and 202c, it is possible to grasp also a variation of facial muscles from a distribution of normal line vectors. Accordingly, it is possible to utilize the distribution of the normal line vectors for person recognition, facial expression recognition, a gesture command using the head, and the like.

The target object may be a finer unit such as the eye, the nose, the mouth, or the like. For example, if an image of a region of the eye is captured with a somewhat large size and a normal line vector is acquired with fine granularity such as each pixel, fitting with a three-dimensional model of the eyeball is also possible. If the orientation of the eyeball is acquired by such fitting, this can be utilized also for gazing point detection of a user to be captured.

Figure 12:
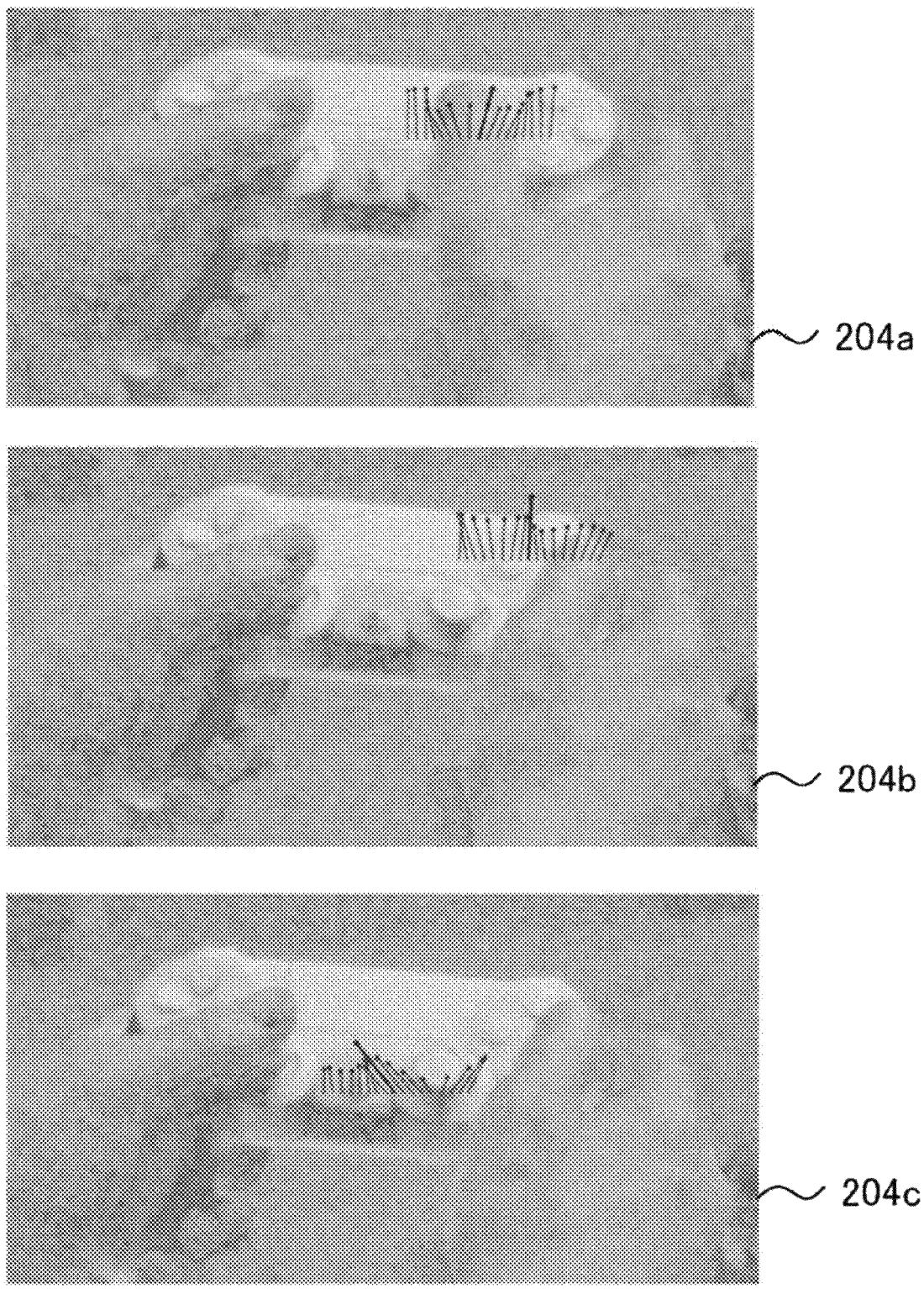
FIG. 12 is a view exemplifying distributions of normal line vectors obtained in the embodiment 1.

FIG. 12 depicts a game controller and the hands of a person as a target object. As depicted in images 204a and 204b, although the controller and the hands are different in color or material, a continuous normal line distribution is obtained that reflects unevenness at locations at which fingers of the hands exist and the surrounding controller surface. Further, as depicted in an image 204c, a complicated shape of a button, a joystick, and the like provided in the controller is also grasped. In particular, since a target object having a complicated shape can be recognized and a movement of fingers of the hands with respect to the target object can be also specified, a controller that can be operated without having many hardware keys equipped thereon can be implemented.

Further, in a case where a movement of the controller itself is to be reflected on a game or the like, a technique has been adopted by which a marker that emits light in a predetermined color is provided on the controller such that the figure of the marker is tracked on a captured image. In this case, it is basically necessary to always keep the marker in a lighting state. According to the present embodiment, since a movement of the controller or a relationship between the movement of the controller and the fingers of the hands of the user can be acquired without depending upon such a marker as described above, power necessary for lighting of the mark can be saved. It is to be noted that, also in the present embodiment, a controller including a light emitting marker may be introduced such that the marker is utilized to extract a region of a figure more accurately by temporarily lighting the marker.

Figure 13:
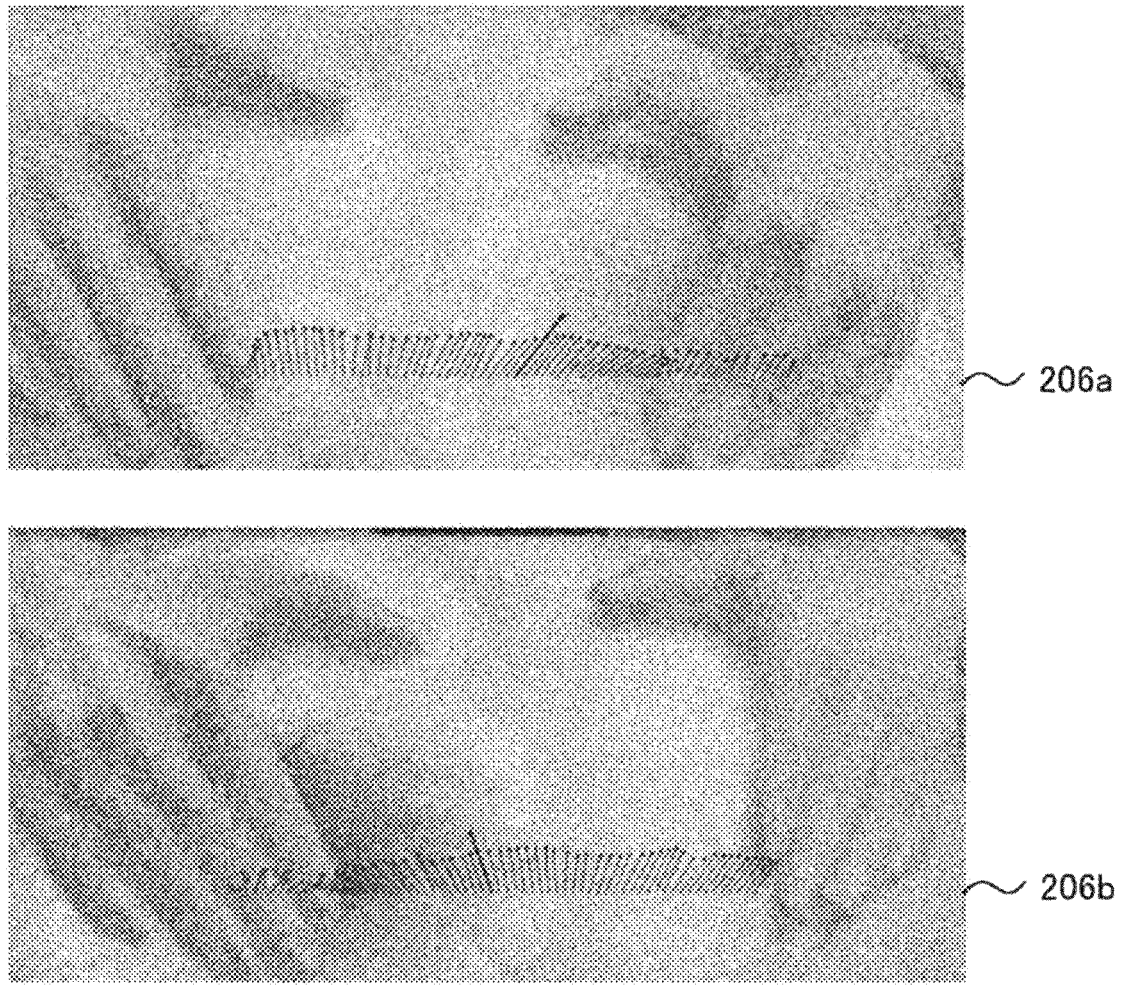
FIG. 13 is a view exemplifying distributions of normal line vectors obtained in the embodiment 1.

FIG. 13 depicts a rubber ball and the hands of a person. As depicted in images 206a and 206b, a continuous normal line distribution is obtained which reflects unevenness of the surface of the rubber ball and the surface of the fingers of the hands. Further, also at portions at which the rubber ball surface is pressed by the hands to be concaved, normal line vectors that reflect the same are obtained. Even in regard to an article that is deformable by the hand of a person or the like in this manner, a subtle shape change of the article can be grasped in detail. Accordingly, it is possible to use an elastic body as a controller or to express an image in which a soft real article and a virtual object interact with each other.

According to the present embodiment described above, a position, a posture, or a shape of a target object is specified by acquiring a distribution of normal line vectors from a region of a figure of the target object from within a polarized image and adjusting the state of a three-dimensional model so as to match with the distribution of the normal line vectors. By setting a restrictive range in the image as a processing target object, normal line vectors can be obtained uniformly and stably within the range. As a result, the influence on an analysis result by various factors that bring about a change in polarization characteristic, such as a color, a material, an illumination, a positional relationship with an imaging apparatus, and the like can be reduced. Further, since a restrictive range is to be processed, an efficiency is improved.

Further, since a normal line vector is obtained in a unit of a pixel, even if the figure on a captured image is small because the size of the target object is small or is positioned apart from the imaging apparatus or even if the target object has a fine structure, they can be grasped. Accordingly, fitting with a three-dimensional model, which accurately represents also a detailed structure, with high affinity is possible. Further, since many processes till the fitting can be carried out in parallel in a unit of a pixel, a unit of a polygon, and the like, the state of the target object can be specified efficiently and particularly.

If state information obtained in this manner is suitably combined with a past technology such as visual tracking, depth image generation, or the like, even if the target object is small in feature amount and therefore is likely to suffer from errors, a processing result can be obtained with a high degree of accuracy from the target object. Further, by reflecting reliability of normal line vectors on fitting evaluation, the influence of errors that may possibly arise from utilization of a polarized image can be eliminated as much as possible.

Embodiment 2

Figure 14:
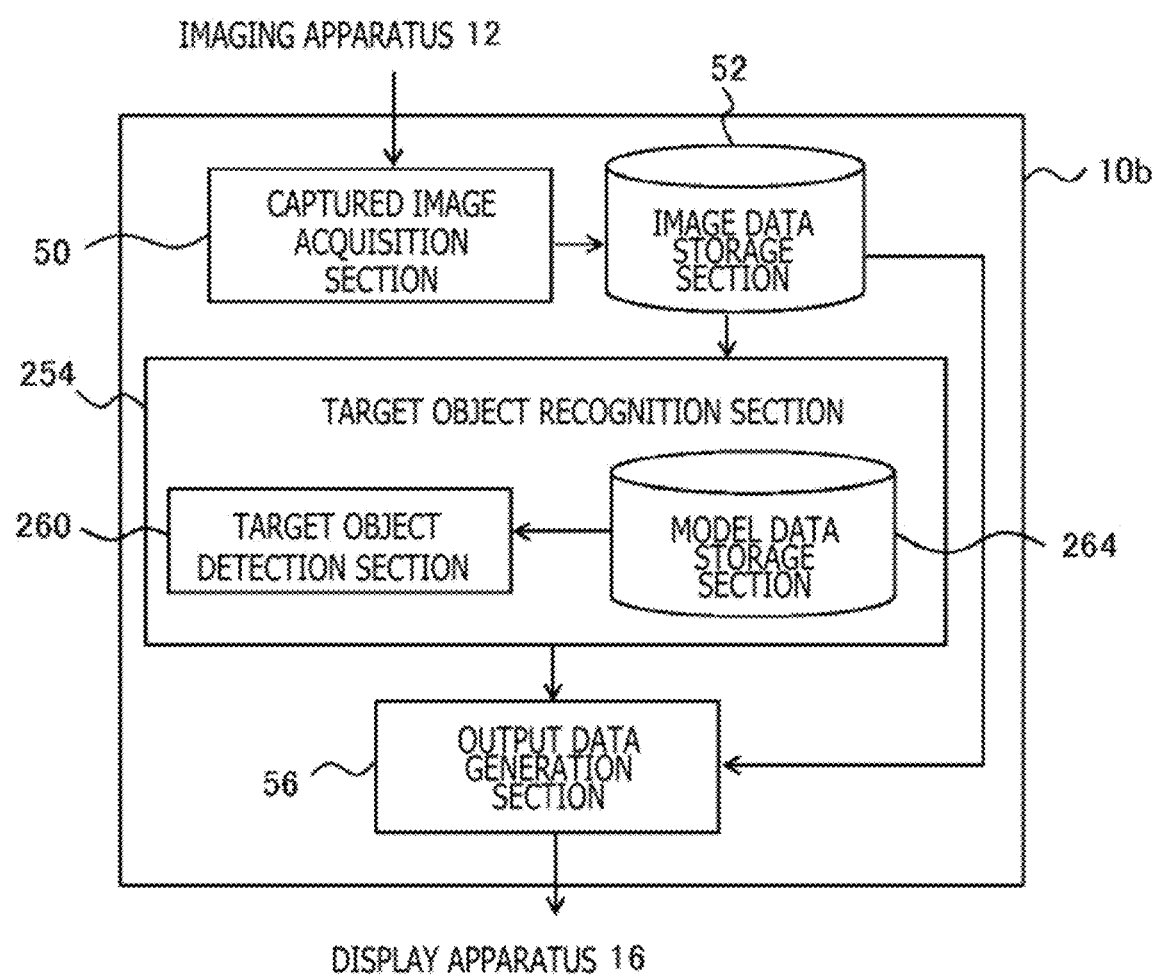
FIG. 14 is a view depicting a configuration of functional blocks of an information processing apparatus in an embodiment 2.

In the embodiment 1, fitting between a distribution of normal line vectors obtained from a polarized image and a three-dimensional model of a target object is performed to particularly specify a state of the target object. In the present embodiment, a position or a size of a target object is specified utilizing a polarized image or normal line information of the polarized image, and a result of the specification is utilized for information processing. FIG. 14 depicts a configuration of functional blocks of an information processing apparatus 10b of the present embodiment. It is to be noted that a configuration example of an information processing system including the information processing apparatus 10b or an internal circuit configuration of the information processing apparatus 10b may be similar to that described hereinabove in connection with the information processing apparatus 10a in the embodiment 1. Blocks having like functions to those of the information processing apparatus 10a depicted in FIG. 4 are denoted by like reference characters, and description of them is suitably omitted.

The information processing apparatus 10b includes a captured image acquisition section 50, an image data storage section 52, a target object recognition section 254, and an output data generation section 56. Functions of the captured image acquisition section 50, the image data storage section 52, and the output data generation section 56 may be similar to the functions of the blocks depicted in FIG. 4. The target object recognition section 254 is implemented by the CPU 23, the GPU 24, or the like and includes a target object detection section 260 and a model data storage section 264. The target object detection section 260 performs some detection process for one of polarized images of the individual orientations obtained from the imaging apparatus 12 or an image in which each of factors of normal line vectors calculated from a polarized image by the technique described hereinabove in the embodiment 1 is a pixel value, to detect a figure of the target object.

For example, a figure of a target object is detected by performing a matching process using a template image prepared in advance. As an alternative, an edge image is generated using an edge enhancement filter, and a figure of a target object is detected by matching of the edge image with shape data of a contour line prepared in advance. For the matching with a template image or the matching with a contour shape, any of techniques that have been used for a captured image in natural light may be adopted. In the model data storage section 264, data of template images to be used for matching and images representative of shapes of contour lines are stored in advance.

The target object detection section 260 may perform visual tracking by performing a matching process while a movable range or a motion vector is estimated utilizing a detection result obtained in a preceding image frame. In this case, if a time variation of the shape of the figure is also estimated, even if the target object has an apparent shape that differs depending upon the orientation thereof, the target object can be detected. Then, the target object detection section 260 generates necessary data relating to the state of the target object and outputs the data to the output data generation section 56. For example, the target object detection section 260 specifies the position of the target object in the real space on the basis of the position of the detected figure on the image plane and the apparent size of the figure, and outputs such information of the position. If the target object has an apparent shape that differs depending upon the orientation thereof, then the orientation may be specified on the basis of the shape of the figure, and such information of the orientation may be output. Further, if information of the figure can be generated on the basis of the position, the size, and the shape of the figure on the image plane, the substance of the information is not restricted particularly.

As described hereinabove in the embodiment 1, a polarized light component observed in one target object that is restricted in color or material varies smoothly along the surface shape of the target object. In particular, in a polarized image or an image in which a normal line vector is given as a pixel value, a figure in a unit of a target object is likely to appear clearly and is suitable for a matching process. Even if this is compared with a general matching process based on a color or a feature point of the target object, stabilized detection is possible without depending upon an external factor such as a brightness or a color of an illumination or a quantity of feature points the target object has. As a result, even if an imaging environment or a target object varies, information processing according to the state of the target object can be performed stably.

Embodiment 3

In the embodiments 1 and 2, a model or an image of a target object prepared in advance is collated with information obtained from a polarized image to specify a state of the target object. In the present embodiment, an image plane is segmented on the basis of a distribution of normal line vectors. Also in this embodiment, it is utilized that a polarization characteristic representative of a surface of one subject demonstrates a similar behavior. In particular, normal line vectors obtained from a polarized image are small in dispersion in a figure of one subject and have continuity in positional variation. In short, it is considered that the distribution of normal line vectors is stable. By evaluating normal line vectors from a point of view of stability as a set, such regions as a figure of a subject appearing as the foreground and a surrounding space (background) are distinguished without preparing a shape model.

Figure 15:
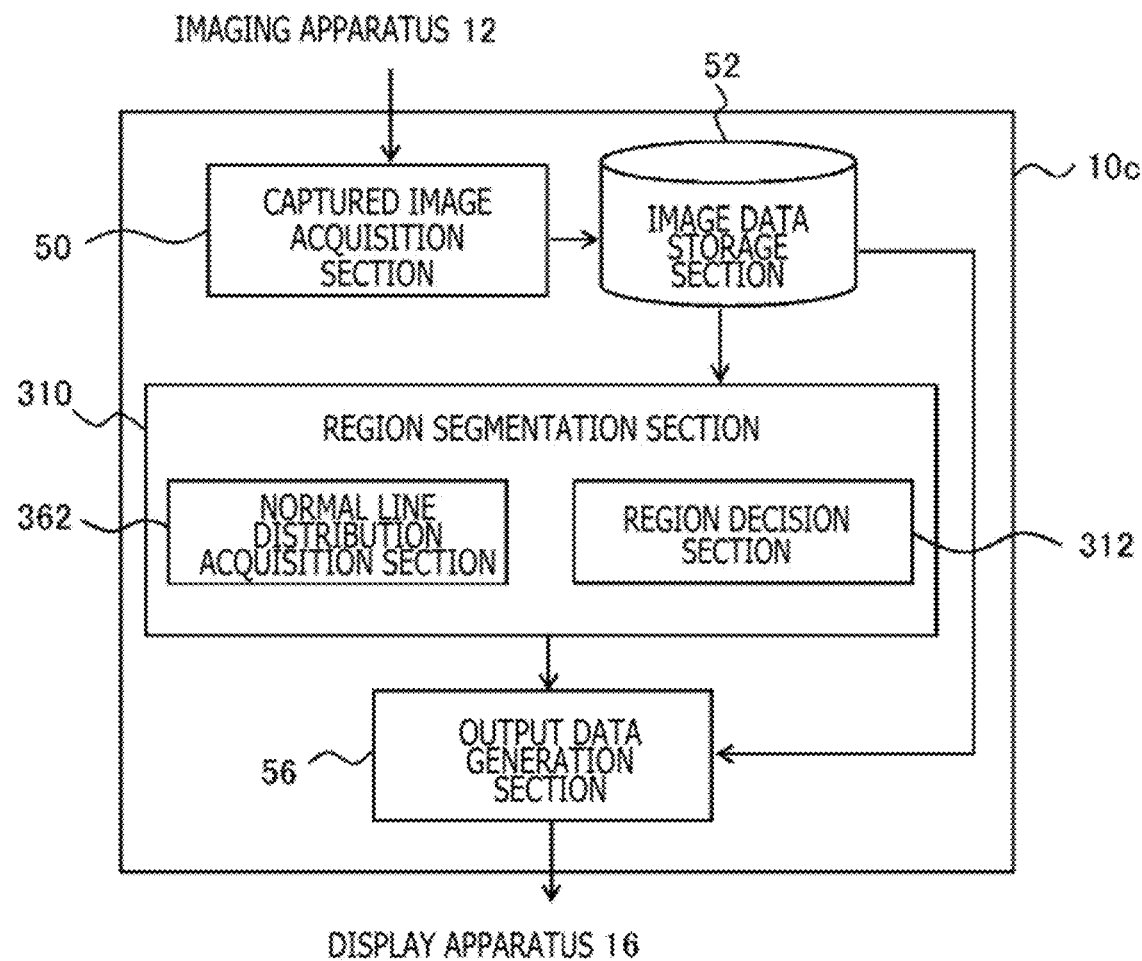
FIG. 15 is a view depicting a configuration of functional blocks of an information processing apparatus in an embodiment 3.

FIG. 15 depicts a configuration of functional blocks of an information processing apparatus 10c of the present embodiment. It is to be noted that a configuration example of the information processing system including the information processing apparatus 10c and an internal circuit configuration of the information processing apparatus 10c may be similar to those described hereinabove in connection with the information processing apparatus 10a in the embodiment 1. In the following description, blocks having functions same as those of the information processing apparatus 10a depicted in FIG. 4 are denoted by the same reference characters, and description of them is suitably omitted. The information processing apparatus 10c includes a captured image acquisition section 50, an image data storage section 52, a region segmentation section 310, and an output data generation section 56.

Functions of the captured image acquisition section 50, the image data storage section 52, and the output data generation section 56 may be similar to the functions of the blocks depicted in FIG. 4. The region segmentation section 310 includes a normal line distribution acquisition section 362 and a region decision section 312. The normal line distribution acquisition section 362 acquires a distribution of normal line vectors using a plurality of polarized images of different orientations by calculation similar to that by the normal line distribution acquisition section 62 depicted in FIG. 4. However, in the present embodiment, since it is focused to segment an image plane into regions, basically normal line vectors are acquired from the entire image plane.

The region decision section 312 classifies normal line vectors in accordance with a predetermined criterion that indicates stability to segment the image plane into regions. In particular, the region decision section 312 decides whether or not variations of a dispersion or position of normal line vectors are within a range within which they can be regarded as those belonging to a surface of one subject. In a case where the dispersion is within a predetermined range or continuity is demonstrated by the variation in regard to position, a region in which such a normal line vector group as just described is obtained is determined as a figure of a subject serving as the foreground and is distinguished from the other region. Details will be hereinafter described. The region decision section 312 generates an image or the like in which results of such region segmentation are represented distinctly on an image plane as region segmentation information and output to the output data generation section 56.

In this case, the output data generation section 56 may detect a figure of the target object by a different technique and integrate the figure with the results of the region segmentation to specify the state of the target object more particularly. This process may include a matching process that uses a polarized image or a natural image or a generation process of a depth image. For example, an integration process of acquiring a position of each subject or discriminating a figure of a particular target object is performed by referring to the position information represented by the depth image in regard to a region in which it is determined by the region segmentation that normal line vectors have continuity.

In addition, it will be recognized by those skilled in the art that the information processing to be performed utilizing a result of the region segmentation of an image such as to perform a face recognition process for a region extracted as the foreground to specify a person can be considered variously. Naturally, as described hereinabove in the embodiment 1, the acquired information of the target object may be used to further carry out information processing for causing the game to progress or causing a virtual object to be drawn on the captured image or generation of output data.

Figure 16:
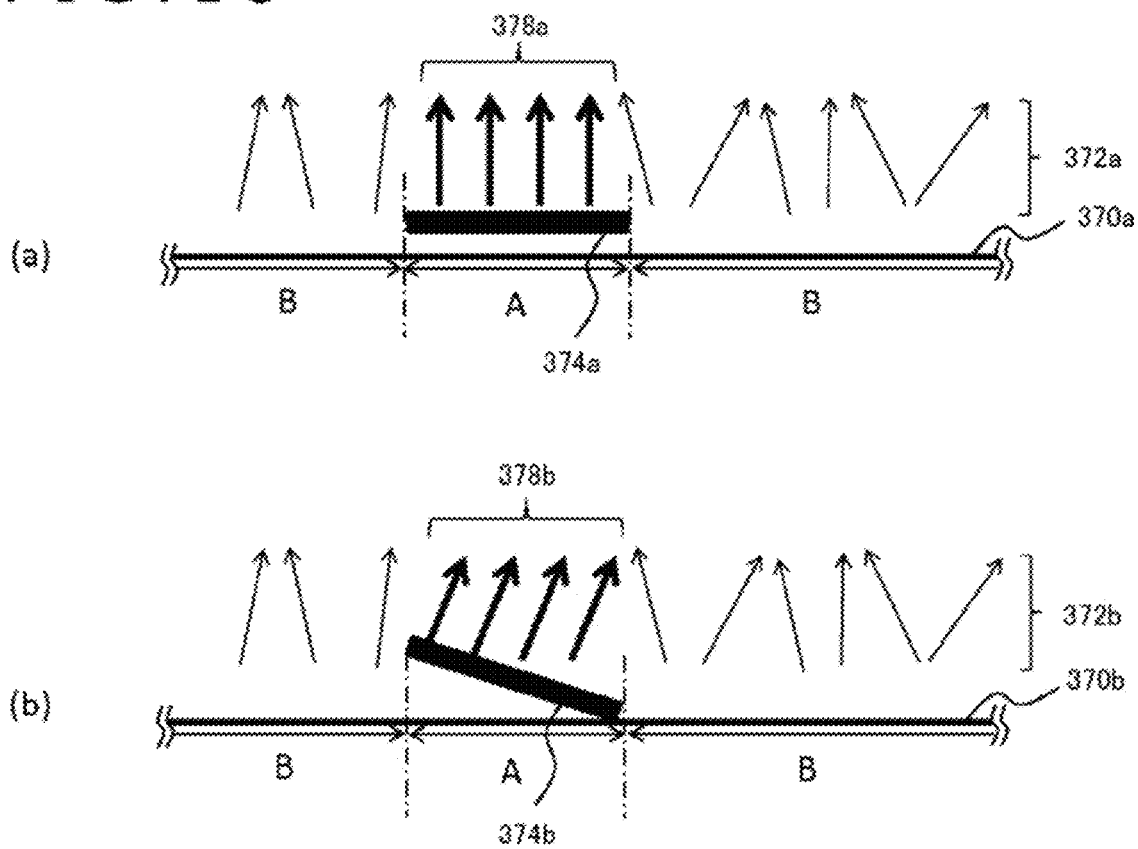
FIG. 16 is a view illustrating a principle of segmenting an image plane into regions on the basis of a distribution of normal line vectors in the embodiment 3.
Figure 17:
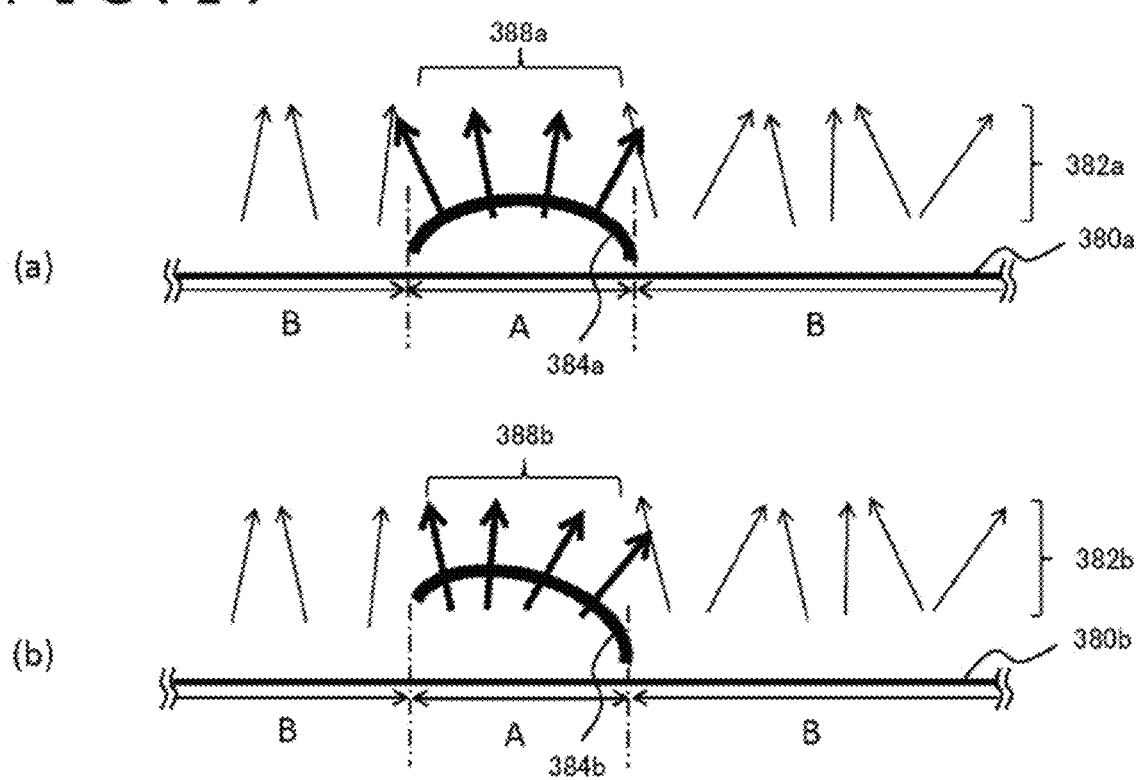
FIG. 17 is a view illustrating another principle of segmenting an image plane into regions on the basis of a distribution of normal line vectors in the embodiment 3.

FIGS. 16 and 17 are views illustrating a principle of segmentation of an image plane on the basis of a distribution of normal line vectors in the present embodiment. In FIG. 16, normal line vectors 372a and 372b obtained at different positions when image planes 370a and 370b are viewed from a horizontal direction are exemplified by arrow marks. In FIG. 16, a manner of subjects 374a and 374b as viewed from the same direction is depicted in a corresponding relationship to the positions on the image planes 370a and 370b on which the subjects 374a and 374b appear, respectively. Since, in one imaging object, light reflected from there includes almost similar components as described above, a relative variation of normal line vectors comes close to a variation that purely reflects an inclination of the surface.

In other words, in comparison with a peripheral region in which articles of various materials, colors, and shapes can exist, in a region of a figure of one subject, the dispersion of normal line vectors is small. In the case of the subjects 374a and 374b having such a planar configuration as depicted in FIG. 16, even if they are parallel to the image plane 370a as depicted in (a) of FIG. 16 or have an inclination with respect to the image plane 370b as depicted in (b) of FIG. 16, the normal line vectors 378a and 378b in the region of the figure are directed to the substantially same direction.

On the other hand, in peripheral regions of the subjects 374a and 374b, normal line vectors indicate different directions, or a dispersion becomes great depending upon the difference in material, color, or orientation of a different subject appearing as a figure in the regions. A shadow is frequently formed between a subject and another subject, and in a case where orientation dependency of the polarization degree cannot be obtained from this, the distribution of normal line vectors is sometimes dispersed by the influence of noise. Accordingly, the region decision section 312 extracts groups of the normal line vectors 378a and 378b because they are small in dispersion and distinguishes a region A that indicates the normal line vectors and the other regions B to obtain region segmentation information.

Although, also in FIG. 17, normal line vectors 382a and 382b obtained at different positions when image planes 380a and 380b are viewed in a horizontal direction are indicated by arrow marks similarly as in FIG. 16, in the present example, subjects 384a and 384b have curved shapes. In this case, as indicated in (a) and (b) of FIG. 17, normal line vectors 388a and 388b in the regions of figures vary in directions that reflect the curved surface. However, unless the material or the color does not vary by a great amount, the range of the variation of the normal line vectors 388a and 388b is restrictive and besides the variation has continuity irrespective of the inclination of the subjects 384a and 384b themselves. Accordingly, also in this case, the region decision section 312 extracts groups of the normal line vectors 388a and 388b because they are small in dispersion and distinguishes the region A that indicates the normal line vectors and the other regions B to obtain region segmentation information.

Figure 18:
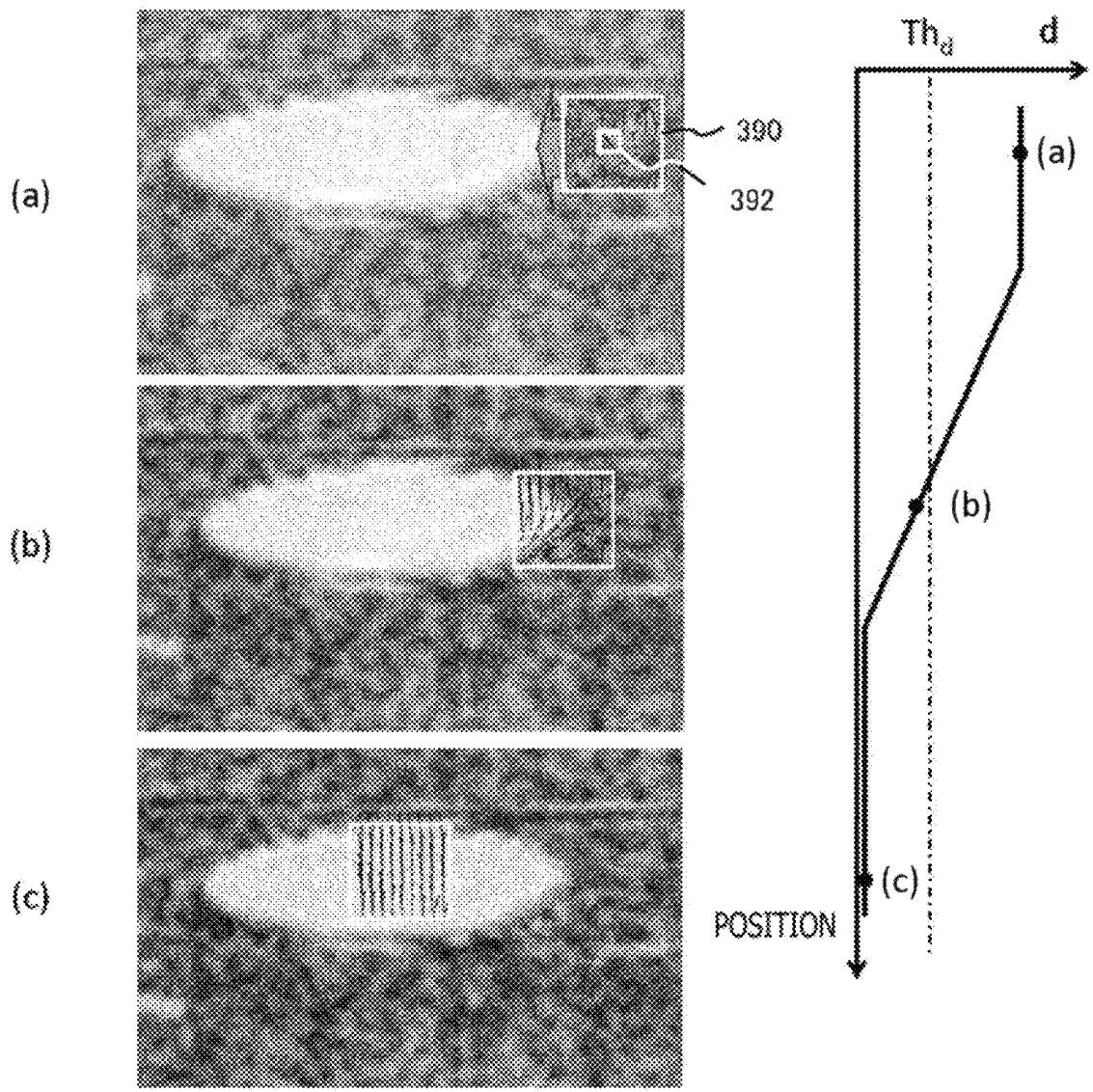
FIG. 18 is a view illustrating an example of a particular technique of segmenting an image plane into regions from a distribution of normal line vectors by a region decision section in the embodiment 3.

FIG. 18 is a view illustrating an example of a particular technique performed by the region decision section 312 performing segmentation of an image plane from a distribution of normal line vectors. Here, in images depicted in (a), (b) and (c) of FIG. 18, normal line vectors acquired by the normal line distribution acquisition section 362 from a polarized image obtained when an image of a table having a circular top plate is captured are set as pixel values of a captured image plane. According to this technique, a search window 390 of a predetermined size is set to the image plane as depicted in (a) of FIG. 18. Then, the difference d between an average vector of normal line vectors in the search window 390 and an average vector of normal line vectors in a reference region 392 having a predetermined size smaller than that of the search window 390 and positioned at the center of the search window 390 as indicated by the following expression is acquired as an index representative of the dispersion of normal line vectors.

[Math. 7]

$$d = \frac{\sum_{i=0}^{N-1} p_i}{N} - \frac{\sum_{i=0}^{n-1} p'_i}{n}$$ (Expression 7)

Here, a normal line vector in the search window 390 from among the normal line vectors acquired by the normal line distribution acquisition section 362 is represented by $p_i$, the number of normal line vectors obtained in the search window 390 by N, a normal line vector in the reference region 392 by $p'_i$ and the number of normal line vectors obtained in the reference region 392 by n. The region decision section 312 acquires a distribution of indexes d representative of dispersions of normal line vectors in regard to the image plane by successively calculating the expression 7 while the search window 390 is successively moved over the overall image.

In the case of FIG. 18, as the area of a portion of the search window 390 that overlaps with the figure of the table increases, the orientations of normal line vectors are aligned in the same direction. Then, in the state of (c) of FIG. 18 in which the overall search window 390 is included in the figure of the table, the normal line vectors inside thereof are aligned to a substantially fixed direction. If such a variation as just described is represented as a variation of the index d at individual positions of the search window, then, for example, such a graph as depicted on the right side in FIG.

18 is obtained. In the graph, coordinates indicated by black circles exemplify calculation results of the index d at the positions of (a), (b) and (c) of FIG. 18. The region decision section 312 extracts a set of position coordinates of the center of the search window when the index d lower than a predetermined threshold value $Th_d$ set for the index d as a region of the subject, namely, as the region A depicted in FIGS. 16 and 17.

The minimum value of the index d to be reached when the overall search window 390 is included in the figure of the subject differs depending upon a shape or inclination of the imaging object. Accordingly, an optimum value of the threshold value $Th_d$ is suitably acquired by an experiment or the like preferably in response to the size of the search window to be set, a supposed shape of a target object, and the like. As an alternative, the threshold value $Th_d$ may be set adaptively in response to a minimum value of the index d in a preceding image frame or an estimated direction of the subject. However, the technique for evaluating a dispersion of the normal line vectors is not limited to this, and the dispersion may be evaluated from a statistical point of view such as a standard deviation. Further, by further evaluating a property relating to the orientation of normal line vectors within a region obtained by such segmentation, the region may be further segmented into smaller regions.

Figure 19:
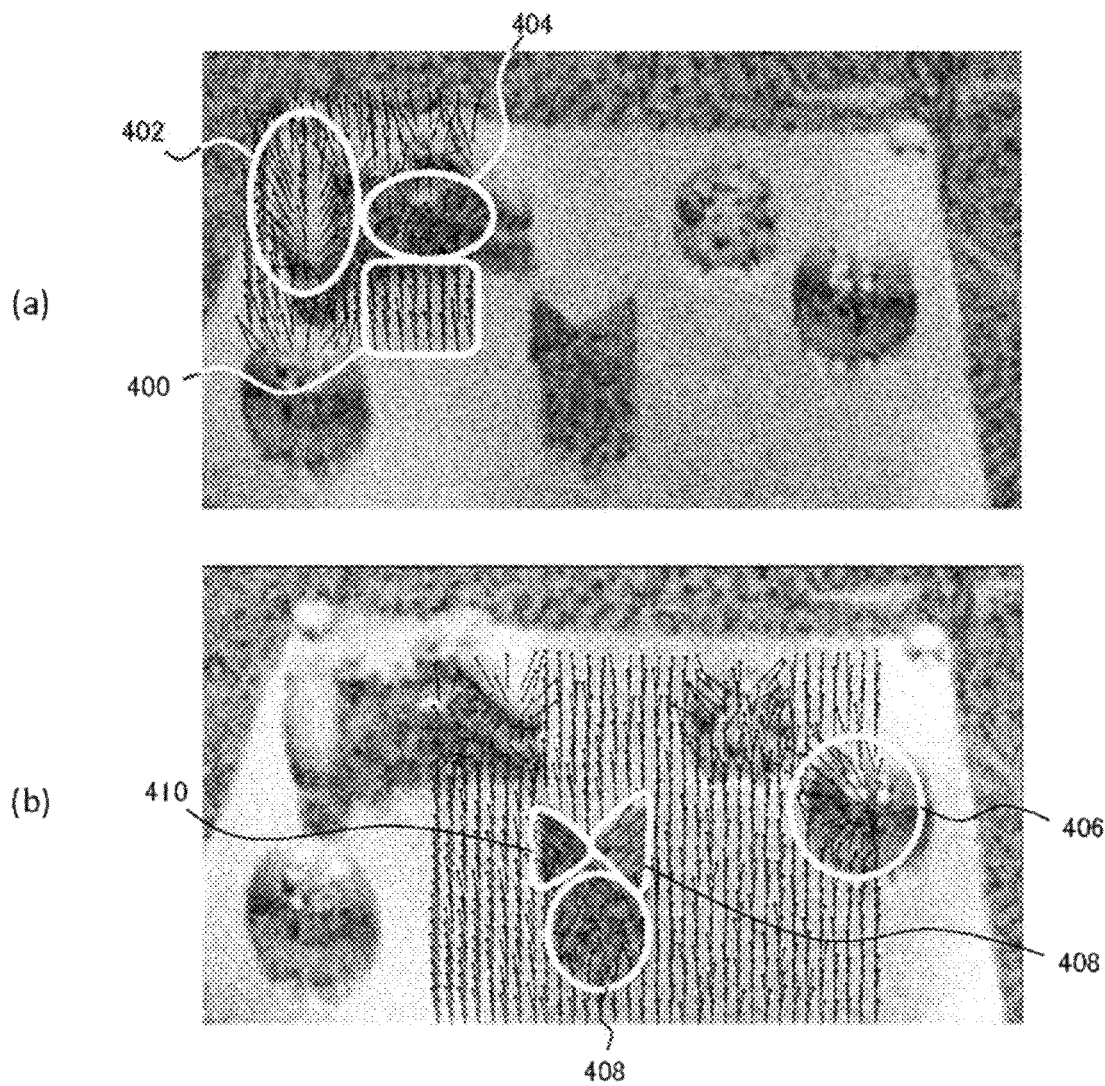
FIG. 19 is a view depicting an example of a region identified on the basis of a distribution of normal line vectors in the embodiment 3.

FIG. 19 depicts examples of regions identified on the basis of a distribution of normal line vectors in an actual image. Here, images depicted in (a) and (b) of FIG. 19 are obtained by capturing a space in which solid bodies of various shapes exist on a rectangular table, and each image displays in an overlapping manner in which the normal line vectors at each portion to be focused are represented by arrow marks. First, (a) of FIG. 19 represents a game controller and a distribution of normal line vectors around the game controller.

Since the upper surface of the table has a flat shape, a region 400 in which the normal line vectors indicate a substantially same direction is identified as a region of the figure of the controller. In a mode in which a user moves an article on the table, the region 400 of the figure of the table can be specified also from that the variation from a preceding image frame is very small. Further, another region 402 that corresponds to a portion of a handle can be distinguished from the other portion according to such regularity representing a substantially elliptical member in that a radial distribution of the normal line vectors in one direction of the image is obtained similarly within a fixed range in a perpendicular direction to the one direction.

Thus, a region in which the dispersion of the normal line vectors is small can be further classified in response to such a property of orientation, regularity, or the like of the normal line vectors. When a property is to be obtained, an average value of the normal line vectors in the search window may be used, or a property may be decided separately from a distribution of points or the like when components represented by the individual normal line vectors are plotted as three-dimensional position coordinates, similarly as described above. For example, in the case of the region 400, plotted points are concentrated at substantially same position coordinates in the three-dimensional space. In the case of the region 402, plotted points are distributed with an extent having a shape according to the curved surface of the subject.

If regions are successively extracted in this manner, then the remaining region is a region in which the dispersion of the normal line vectors is great like, for example, a region 404. In the example of FIG. 19, the region 404 is a portion that is a shadow of the controller, and the normal line vectors therein are unstable by an influence of noise. Meanwhile, (b) of FIG. 19 represents a parallelepiped, a sphere, and the like and a distribution of normal line vectors around them. From within the distribution of normal line vectors, normal line vectors in regions 408 and 410 corresponding to two surfaces configuring the parallelepiped are directed to substantially same directions, and the directions differ in the individual regions, so that the regions 408 and 410 are identified as separate regions. Further, a region 406 corresponding to the surface of the sphere is identified from any other region according to such regularity representing a sphere in that the normal line vectors are obtained radially in two directions of the image.

A region in which normal line vectors indicate substantially the same directions around the regions 406, 408, and 410 corresponds to the upper surface of the table similarly to the region 400 of (a) of FIG. 19 and is identified from a region of the figure of the solid body placed on the upper surface of the table. Further, the region 408 that remains as a region other than the regions extracted in this manner and in which the dispersion of the normal line vectors is great is a portion that is a shadow of the solid body similarly to the region 404 of (a) of FIG. 19. It is to be noted that distinction of each surface of the parallelepiped, the upper surface of the table, and the region of the figure of the sphere is performed by further evaluating the normal line vectors in a region in which the dispersion is small as described above.

Figure 20:
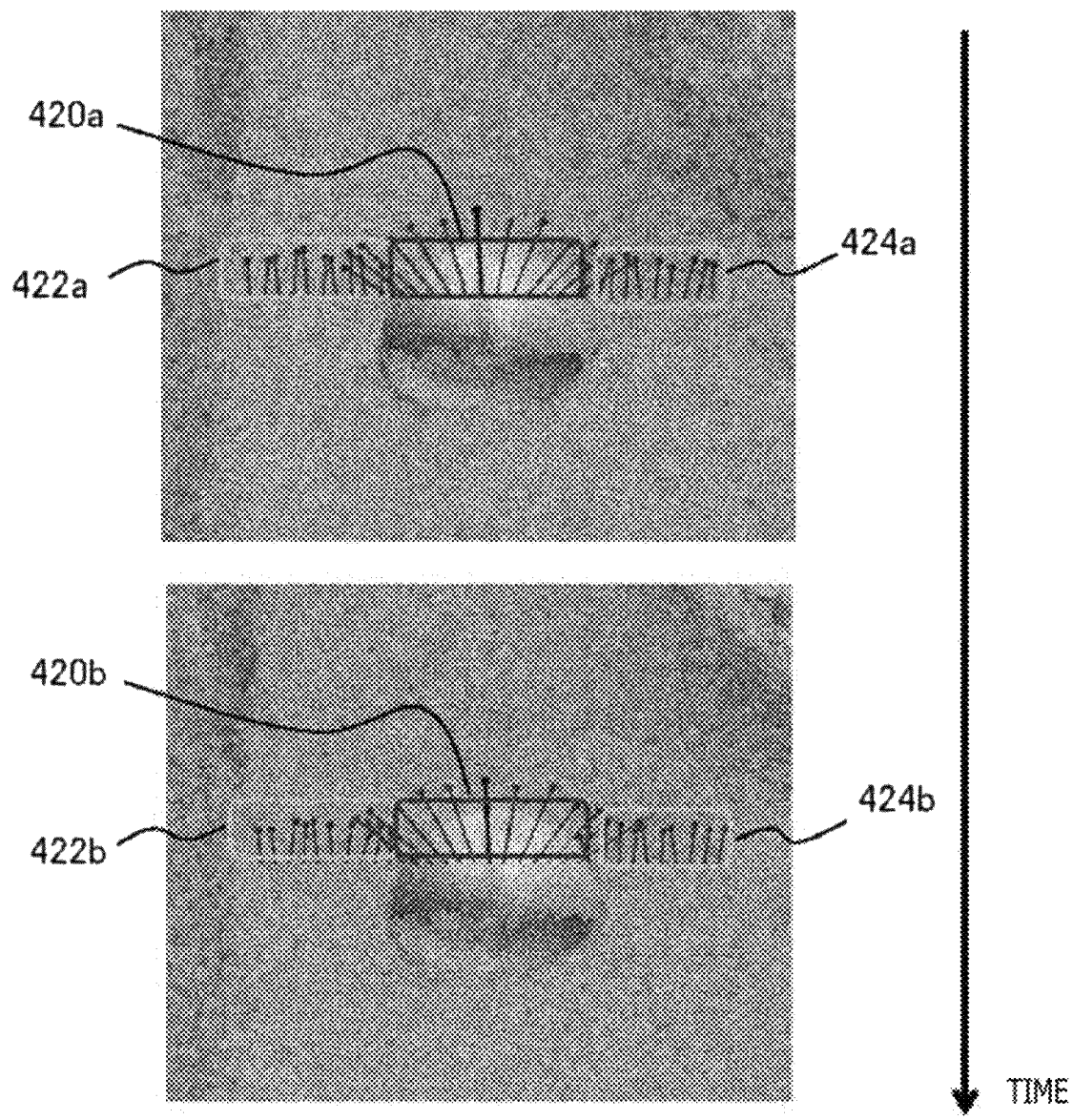
FIG. 20 is a view illustrating an example of a criterion that can be used for region segmentation in the embodiment 3.

Although principally a criterion based on the magnitude of the dispersion of the normal line vectors is used for region segmentation of an image in the foregoing description, a segmentation criterion may be set from any other point of view. FIG. 20 is a view illustrating an example of a criterion that can be used for region segmentation. Two images of FIG. 20 depict image frames at different timings when an image of the same hemisphere is captured as a moving image. As described hereinabove, since the dispersion of observed normal line vectors is small on the surface of a hemisphere, regions 420a and 420b can be distinguished from surrounding regions 422a, 424a, 422b, and 424b. Also, this characteristic is similar without depending upon image frames.

Further, while, in the regions 420a and 420b of the figure of the hemisphere, the direction of the normal line vectors gradually varies along the variation of the inclination of the hemisphere surface, in the surrounding regions 422a, 424a, 422b, and 424b, the direction of the normal line vectors varies irregularly. Accordingly, it is also possible to distinguish a region in accordance with the criterion of whether or not the variation of normal line vectors is continuous. For example, the variation of a difference between neighboring normal line vectors is acquired for each position on the image plane, and a region in which the difference monotonously decreases or increases within a range smaller than a predetermined threshold value is extracted and is identified from any other region. Also, this characteristic is similar without depending upon image frames.

Further, normal line vectors whose distribution is irregular as in the regions 422a, 424a, 422b, and 424b have a tendency that they are not stabilized also with respect to time. Also in the two image frames depicted in FIG. 20, while the normal line vectors in the regions 420a and 420b hardly vary, in the regions 422a and 422b and the regions 424a and 424b, a variation can be seen in the normal line vectors. This also arises from the fact that the calculation accuracy of normal line vectors deteriorates by an influence of a shadow, a material, or the like. Accordingly, also it is possible to distinguish a region using the magnitude or irregularity of the time variation of normal line vectors as a criterion.

For example, from successive image frames at predetermined minute time intervals, a region in which the variation amount of average vectors acquired through a search window at the same position is smaller or greater than a predetermined threshold value is extracted or a region in which the average vector varies irregularly is extracted to distinguish the region from any other region. In order to make a distinction of this from a case in which a subject is intentionally moved, this criterion may be introduced for a region in which no motion is observed on an image plane or a standard deviation of normal line vectors in the search window may be monitored such that a region in which the variation of the standard deviation is great is decided that it has temporal instability. The criteria for segmentation of a region exemplified above can be summarized in the following manner.

TABLE 1

|  | Dispersion | Continuity of variation | Time variation |
| --- | --- | --- | --- |
| First region | Small | Continuous | Small |
| Second region | Great | Discontinuous | Great |

In the table above, the "first region" is a region considered as a figure of a subject configuring the foreground, namely, a figure of the target object, and the "second region" is any other region. Basically, although it is conceivable to extract the first region from an image plane as region segmentation and utilize it in later information processing, the second region may be extracted first with the remaining region utilized as the first region, in some cases. Further, one of the criteria may be introduced, or two or more criteria may be used in combination.

For example, a region may be segmented in accordance with a plurality of criteria such that the first region is finally determined by a product set or a sum set of them, or a score indicative of the possibility that a region may be the first region for each of the plurality of criteria such that region segmentation may be performed with an overall score or a weighted average. Further, while, in the table above, a region is segmented into two regions by setting one threshold value for each criterion, the region may otherwise be segmented into three or more regions by setting two or more threshold values such that a final segmentation region is determined by integrating a result of them.

Figure 21:
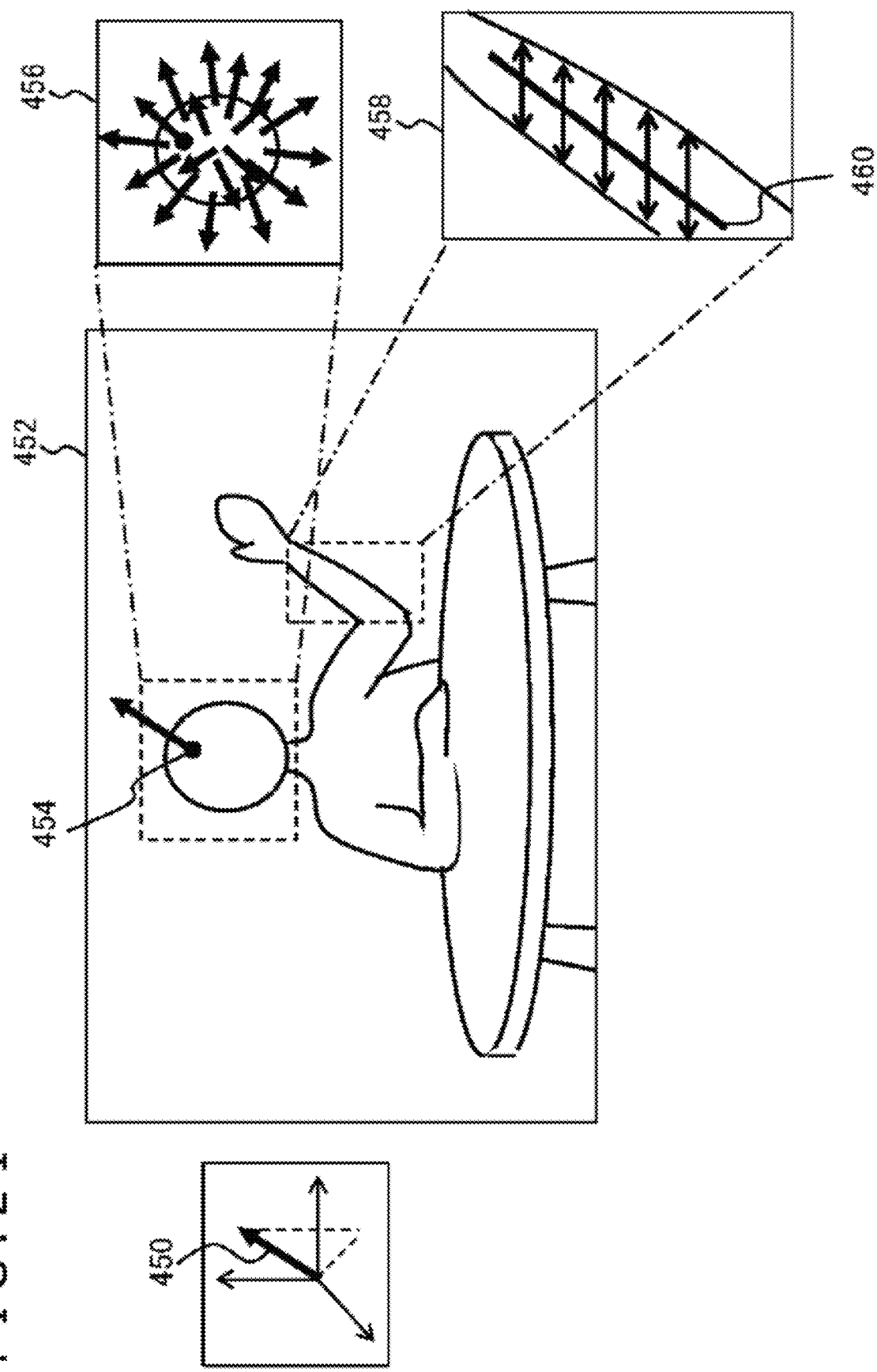
FIG. 21 is a view illustrating another example of a technique of segmenting an image plane into regions from a distribution of normal line vectors by the region decision section in the embodiment 3.

FIG. 21 is a view illustrating another example of the technique by the region decision section 312 for performing region segmentation of an image plane from a distribution of normal line vectors. In this example, the region decision section 312 first extracts, from among normal line vectors acquired in units of pixels by the normal line distribution acquisition section 362, a normal line vector having a small difference to such an extent that the normal line vector coincides in direction or that the normal line vector can be regarded as coinciding in direction with a set normal line vector, and specifies position coordinates of the pixel. Then, the normal line distribution acquisition section 362 determines the extracted pixel as a base point and successively searches for a range in which normal line vectors that have continuity in variation around the base point are obtained to extract a region of the figure of the target object.

Here, the normal line vectors that have continuity are normal line vectors in which the difference between neighboring normal line vectors is smaller than a predetermined threshold value and the difference monotonously decreases or increases with respect to the position, similarly as in the example of FIG. 20, for example. As an alternative, continuity may be evaluated statistically such that a distribution of points when components represented by individual normal line vectors are plotted as three-dimensional position coordinates is within a predetermined range.

On the left side in FIG. 21, an example of setting of a normal line vector 450 to be extracted is depicted. Upon setting, it is preferable to determine a representative normal line vector that can be identified readily from a different subject taking a property in shape, a property of a movement, and the like of the target object into consideration. In the case of FIG. 21, the head of a person is assumed as a target object, and one normal line vector 450 is set which has such an orientation that is characteristic to the head and is low in possibility that it may appear on a different subject from among normal line vectors that may be obtained from the surface shape of the head. It is to be noted that the normal line vector 450 may actually be set from components of a three-dimensional vector.

In a case where a region of a figure of the head is obtained in a preceding image frame, a representative normal line vector may be selected on the basis of a predetermined criterion from among normal line vectors obtained actually in the region such that a normal line vector in a current image frame is predicted on the basis of a movement of the normal line vector till then and a value of the predictive normal line vector is used in setting. This process is nothing else to perform a tracking process, which has been performed on the basis of a contour line, a feature point, or the like, on the basis of normal line vectors.

The region decision section 312 searches for a distribution of normal line vectors obtained on an actual captured image 452 on the basis of the normal line vector 450 set statically or dynamically in this manner. Then, the region decision section 312 detects a normal line vector that can be regarded as coinciding in direction with the normal line vector 450 and specifies the position of a pixel 454 at which the normal line vector is obtained. Then, the region decision section 312 successively evaluates the continuity of normal line vectors in regard to pixels around the base point provided by the pixel 454. Since the variation of normal line vectors has continuity on the surface of the same target object as described above, basically a region up to a point immediately before the continuity is lost when the region is expanded from the pixel 454 becomes a region of the figure of the target object.

Furthermore, if the shape of the target object is known, then also the manner of variation of normal line vectors from the position determined as the base point is known. For example, in a case where the target object is the head, if normal line vectors of the surface of an elliptical body are assumed, then normal line vectors to be obtained are approximately determined from the direction and the distance from the pixel determined as the base point. Accordingly, the region decision section 312 successively expands the region to pixels surrounding the pixel 454, pixels surrounding the surrounding pixels, and the like to specify a pixel set indicative of the normal line vectors of the same elliptical body surface.

In FIG. 21, a region 456 including the figure of the head is extracted and depicted, and a normal line vector obtained in regard to the region of the head of the region 456 is indicated by an arrow mark. The region decision section 312 extracts a region of the figure of the head that is a target object by specifying a range of normal line vectors, in which the normal line vectors have continuity and indicate a variation similar to the normal line vectors of the elliptical body surface, by search. Even if a normal line vector whose orientation is regarded as same as that of the set normal line vector 450 is detected in a figure other than that of the head on the captured image 452, according to this search based on the shape, it can be decided whether or not the figure is the head.

It is to be noted that the normal line vector depicted is a schematic one to the last, and actually, a normal line vector is obtained in a finer unit of a pixel. From a target object whose shape is known, an image of a figure can be extracted by a similar procedure without depending upon the shape. It is to be noted that, if the target object is a sphere or an elliptical body, then although it is conceivable to expand the search region such that the base point is surrounded as described above, the search direction for a region is not limited to this, and an appropriate one may be selected depending upon the shape.

For example, in the case of a target object having a shape proximate to a cylindrical shape like an arm or the like, as extracted and depicted in a region 458, pixels from which a normal line vector that can be regarded as coinciding in direction with the set normal line vector is obtained are obtained as a linear pixel set 460. Therefore, the search region is expanded in the leftward and rightward directions on the image from the base point provided by each pixel of the pixel set 460 as indicated by arrow marks. Also in this case, if a cylindrical surface shape is assumed, then since the manner of variation of the normal line vector is known, the region to just before the variation leaves the variation according to the manner of variation becomes the region of the figure of the arm. It is to be noted that it is also conceivable to expand, in addition to a case in which the region is expanded in the horizontal direction on the image as depicted, the search region in a direction perpendicular to the line representative of the pixel set 460.

In the present embodiment, since a distribution of normal line vectors is acquired in units of pixels, pixels or a pixel set included in a figure of a focused target object can be specified easily and with high accuracy, compared to the set normal line vectors. Further, in regard to the same target object, normal line vectors demonstrate a stable variation. By utilizing such characteristics as described above to find an image to be a base point and expand a region from the base point, the region of the figure can be extracted efficiently. Furthermore, by setting a normal line vector to be extracted in an evolutionary way from a preceding image frame taking a time variation such as a movement or rotation of the target object into account, visual tracking based on a normal line vector in place of a contour or a feature point can be implemented as described above.

Figure 22:
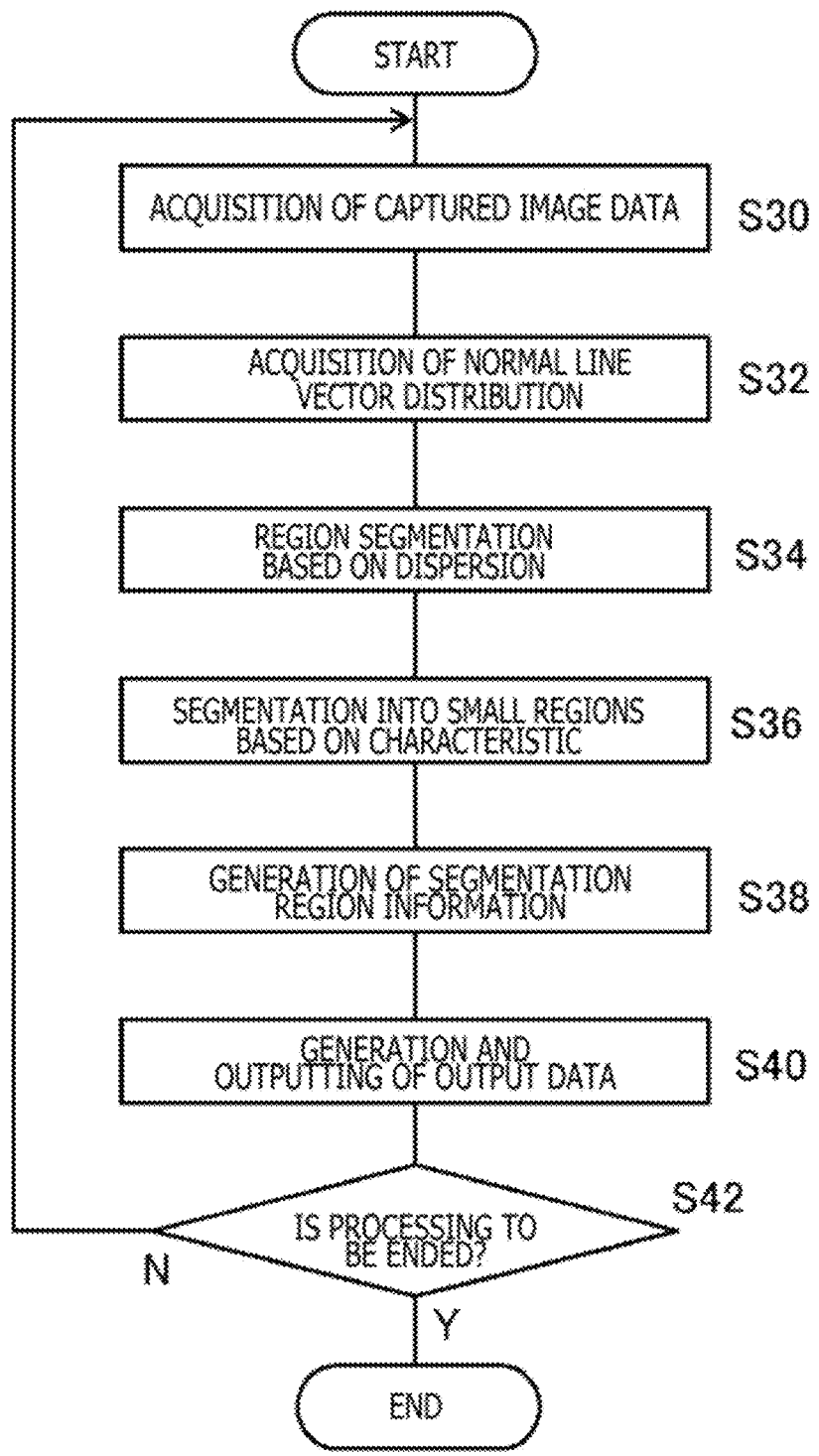
FIG. 22 is a flow chart depicting a processing procedure of segmenting an image plane into regions using a polarized image and generating and outputting output data by the information processing apparatus of the embodiment 3.

Now, operation of the information processing apparatus implemented by the configuration described above according to the present embodiment will be described. FIG. 22 is a flow chart depicting a processing procedure by the information processing apparatus 10c of the present embodiment for segmenting an image plane using a polarized image and generating and outputting output data. The flow chart is started when the user requests starting of processing to the information processing apparatus 10c, and then, the imaging apparatus 12 starts capturing a target object in accordance with the request.

First, the captured image acquisition section 50 acquires data of a captured image from the imaging apparatus 12 (S30). The data may include not only polarized images corresponding to a plurality of main axis angles but also an image in natural light. Then, the normal distribution acquisition section 362 of the region segmentation section 310 acquires a distribution of normal line vectors with respect to an image plane using a polarized image (S32). If the color or the material of a focused target object is restrictive, then, a vector calculation method is optimized by preferably selecting one of a specular reflection model and a diffusion reflection model in response to the distribution of the normal line vectors.

However, since, even in a situation in which a specular reflection component and a diffusion reflection component are mixed, this does not have a significant influence on the relative dispersion, continuity of variation, or time variation of normal line vectors on the surface of the subject, it is not necessary to change over of the model and separate a component for each subject. Then, the region decision section 312 segments the image plane on the basis of the dispersion of the normal line vectors (S34). For example, as described with reference to FIG. 18, an index d to the dispersion is calculated while a search window of a predetermined size is moved, and then, the calculated index d is compared with a threshold value $Th_d$, so that a region of an image of the subject to be captured configuring the foreground and any other region are distinguished from each other. For this region segmentation, a different criterion indicated in the table given hereinabove may be adopted, or a plurality of criteria may be used in combination.

Further, as described hereinabove with reference to FIG. 21, a region of a figure of a target object and any other region are distinguished from each other by searching for a range within which a normal line vector that satisfies a condition is obtained taking a pixel that indicates a specific normal line vector as a base point. Then, the region decision section 312 evaluates a characteristic of the normal line vector in regard to each individual segmentation region to further segment the segmentation region into smaller regions as occasion demands (S36). For example, as described above, a distribution of points formed by plotting components of each normal line vector to three-dimensional coordinates is compared with a condition set in advance for each shape of a subject such that images of planes of different directions are distinguished from each other, or images are distinguished from each other for individual portions having different shapes.

Then, the region decision section 312 generates predetermined segmentation region information such as an image representing a result of the segmentation (S38). In a case where it is specified in the processes at Steps S34 and S36 whether or not the portion is a shadow portion, whether the subject is a flat surface or a curved surface, and a direction in which the plane is directed, or the like is specified, such information may be associated with the region. The output data generation section 56 acquires the generated information and suitably performs such a process as specification of a figure of a target object, specification of a position, progress of a game, or drawing of a virtual object to generate output data of a display image or sound and outputs the output data to the display apparatus 16 (S40).

Within a time period within which there is no necessity to stop the processing in response to a user operation or the like (N at Step S42), the processes at Steps S30 to S40 are repetitively performed for succeeding image frames. Consequently, a game screen image corresponding to the position or movement of the target object or a result of the information processing is displayed as a moving image. If it becomes necessary to stop the processing in response to a user operation or the like, then all processes are ended (Y at Step S42).

With the present embodiment described above, an image plane is segmented on the basis of stability of a distribution of normal line vectors acquired using a polarized image. In particular, a region of an image of a subject configuring the foreground and any other region are distinguished from each other from a point of view of a spatial or temporal dispersion of normal line vectors, continuity of variation, or the like. Consequently, even if the color of appearance varies or the contour of a figure is not clear due to an illumination or the like, or even if the subject has a small number of feature points on the surface thereof, the region of the figure can be acquired with high accuracy.

Further, by evaluating normal line vectors collectively as an aggregation, even if an error is included in a calculated absolute value of the normal line vectors, the influence of the error on the accuracy of region segmentation is low. Accordingly, there is no necessity to change over the model to be used for calculation depending upon the subject or separate components of a luminance. As a result, a region of the picture of the subject can be specified accurately while the load of processing is suppressed, and information processing at a succeeding stage can be performed with high accuracy with a low latency.

The present invention has been described above on the basis of the embodiments. The embodiments described above are examples, and it can be recognized by those skilled in the art that various modifications can be applied to combinations of the constituent components and the processes and that such modifications also fall within the range of the present invention.

For example, while principally the mode in which the user moves or deforms a target object to implement an operation for a game or information processing has been described in the embodiments 1 and 2, the state of the target object itself may not vary. For example, in a case where an imaging apparatus is provided in a head-mounted display, even if the target object is an unmovable object such as a surrounding floor, a wall, or a piece of furniture, the state varies relatively by movement of the imaging apparatus side. Also in this case, similarly as in the present embodiment, the position or the inclination of the target object with respect to the imaging face can be acquired with high accuracy. If this information is applied to a past technology such as SLAM (Simultaneous Localization And Mapping), it is also possible to specify the position or the posture of the head of the user and associate an image to be displayed on the head mount display with the field of view of the user.

Further, while, in the embodiment 3, a distribution of normal line vectors are acquired using polarized images of a plurality of orientations and the image plane is segmented using the acquired normal line vectors, a polarization degree may be used in place of the normal line vectors. In particular, since the present embodiment does not require strict separation of specular reflection and diffusion reflection, even if the polarization degree obtained at a stage before a model is applied is used instead, the region segmentation can be performed by a principle similar to that that is based on a dispersion or continuity of a distribution.

Furthermore, while, in the embodiment 3, the region segmentation section provided in the information processing apparatus uses an image acquired from the imaging apparatus to perform region segmentation based on continuity of a normal line vector distribution, the function may be provided in the imaging apparatus. In short, the imaging apparatus performs region segmentation using a polarized image captured by the imaging apparatus itself. In this case, the information processing apparatus may transmit information relating to a result of the region segmentation together with data of the captured image or may transmit only data of the foreground having continuity in normal line vectors or of a captured image in a partial region including a region of the figure of the subject.

In the latter case, whether or not the transmission target object is to be made partial may be changed over depending upon a frame of a captured moving image. As an alternative, in regard to the same frame, the entire captured image in natural light and partial data of the polarized image may be transmitted. Also in these cases, the information processing apparatus suitably performs merging of a depth image or a target object recognition result or various information processes and generates a result of the same as output data. By using partial data as data to be transmitted from the imaging apparatus, the transmission bandwidth can be saved, and a delay by a transmission process can be reduced.

REFERENCE SIGNS LIST

10a Information processing apparatus, 12 Imaging apparatus, 16 Display apparatus, 23 CPU, 24 GPU, 26 Main memory, 50 Captured image acquisition section, 52 Image data storage section, 54 Target object recognition section, 56 Output data generation section, 60 Region extraction section, 62 Normal line distribution acquisition section, 64 Model data storage section, 66 Model adjustment section, 254 Target object recognition section, 260 Target object detection section, 264 Model data storage section, 310 Region segmentation section, 312 Region decision section, 362 Normal line distribution acquisition section.

INDUSTRIAL APPLICABILITY

As described above, the present invention can be utilized in various information processing apparatus such as a game apparatus, an image processing apparatus, a personal computer, a portable terminal, and the like.

The invention claimed is:

1. An information processing apparatus, comprising:
a normal line distribution acquisition section configured to acquire a distribution of normal line vectors of a subject surface from a captured polarized image;
a region segmentation section configured to specify a region of a figure for each subject and segment an image plane by evaluating stability of the distribution of the normal line vectors with a given criterion; and
an output data generation section configured to perform a process based on a result of the segmentation to generate output data and output the output data,
wherein the region segmentation section evaluates continuity of a variation with respect to positions of the normal line vectors and specifies a region in which it is decided that there is continuity as the region of the figure.

2. The information processing apparatus according to claim 1, wherein the region segmentation section evaluates a dispersion of positions of the normal line vectors and specifies a region in which it is decided that the dispersion is small as the region of the figure.

3. The information processing apparatus according to claim 2, wherein the region segmentation section successively calculates, while the region segmentation section moves a search window of a given size on the image plane, a difference between an average of normal line vectors in the search window and an average of normal line vectors in a reference region set in the search window as an index indicative of the dispersion, and decides a region in which the dispersion is small based on a position of the search window when the index smaller than a given threshold value is obtained.

4. The information processing apparatus according to claim 1, wherein the region segmentation section evaluates a magnitude of time variation of the normal line vectors and specifies a region in which it is decided that the time variation is small as the region of the figure.

5. The information processing apparatus according to claim 1, wherein the region segmentation section performs, based on a characteristic of the normal line vectors in the region of the figure specified for each subject, further segmentation in response to an orientation or a shape of a plane that configures the subject.

6. The information processing apparatus according to claim 1, wherein the region segmentation section detects a position of a normal line vector having a specific direction from within the distribution of the normal line vectors acquired by the normal line distribution acquisition section and searches for a region in which a variation of the normal line vectors has continuity from a base point given by the detected position to specify the region of the figure.

7. The information processing apparatus according to claim 6, wherein the region segmentation section sets the specific direction based on the normal line vectors in the region of the figure specified in a preceding image frame within the polarized image captured at a given frame rate.

8. The information processing apparatus according to claim 6, wherein the region segmentation section searches for a region in which the normal line vectors have variation according to a surface shape of a target object prepared in advance to specify the region of the figure.

9. An image region segmentation method by an information processing apparatus, comprising:

acquiring data of a polarized image captured by an imaging apparatus;

acquiring a distribution of normal line vectors of a subject surface from the polarized image;

evaluating stability of the distribution of the normal line vectors with a given criterion to specify a region of a figure for each subject and segmenting an image plane;

evaluating a dispersion of positions of the normal line vectors;

specifying a region in which it is decided that the dispersion is small as the region of the figure;

calculating, while moving a search window of a given size on the image plane, a difference between an average of normal line vectors in the search window and an average of normal line vectors in a reference region set in the search window as an index indicative of the dispersion;

deciding a region in which the dispersion is small based on a position of the search window when the index smaller than a given threshold value is obtained; and performing processing based on a result of the segmentation to generate output data and outputting the output data to an external apparatus.

10. A non-transitory computer program readable medium having stored thereon a program for a computer, the program comprising:

by a normal line distribution acquisition section, acquiring a distribution of normal line vectors of a subject surface from a captured polarized image;

by a region segmentation section, evaluating stability of the distribution of the normal line vectors with a given criterion to specify a region of a figure for each subject and segmenting an image plane; and by an output data generation section, performing processing based on a result of the segmentation to generate output data and outputting the output data, wherein the region segmentation section evaluates a magnitude of time variation of the normal line vectors and specifies a region in which it is decided that the time variation is small as the region of the figure.

* * * * *